United States Patent
Sumi et al.

(10) Patent No.: US 6,630,225 B2
(45) Date of Patent: Oct. 7, 2003

(54) AUTOMOTIVE EXTERIOR PANEL

(75) Inventors: Takehiko Sumi, Ebina (JP); Teruo Tamada, Yokohama (JP); Akihiko Matsuba, Yamato (JP); Tooru Kodaira, Yamato (JP)

(73) Assignee: Kyoraku Co., Ltd., Kyoto (JP)

( * ) Notice: Subject to any disclaimer, the term of this patent is extended or adjusted under 35 U.S.C. 154(b) by 0 days.

(21) Appl. No.: 10/051,983

(22) Filed: Jan. 18, 2002

(65) Prior Publication Data

US 2002/0102387 A1 Aug. 1, 2002

Related U.S. Application Data

(62) Division of application No. 09/344,801, filed on Jun. 25, 1999, now Pat. No. 6,458,312.

(30) Foreign Application Priority Data

Aug. 7, 1998 (JP) .......................... 10-236485
Jun. 30, 1998 (JP) .......................... 10-199665

(51) Int. Cl.$^7$ .............................. D06N 7/04; B32B 3/00
(52) U.S. Cl. ...................... 428/141; 428/156; 428/336; 428/338; 428/220
(58) Field of Search .................. 428/141, 156, 428/336, 338, 220

(56) References Cited

U.S. PATENT DOCUMENTS

| 4,017,243 | A | | 4/1977 | Lindsay |
| 4,176,101 | A | * | 11/1979 | Leslie et al. ............ 252/182.28 |
| 5,217,729 | A | | 6/1993 | Terauchi et al. |
| 5,354,618 | A | * | 10/1994 | Ishigaki et al. .......... 428/424.8 |
| 5,585,187 | A | | 12/1996 | Shinonaga et al. |
| 5,705,254 | A | * | 1/1998 | Morinaga et al. ...... 219/121.68 |
| 5,747,592 | A | * | 5/1998 | Huff et al. .................. 525/191 |

FOREIGN PATENT DOCUMENTS

EP 623448 A1 11/1994

* cited by examiner

Primary Examiner—Harold Pyon
Assistant Examiner—Patricia L. Nordmeyer
(74) Attorney, Agent, or Firm—Maine & Asmus

(57) ABSTRACT

The present invention relates to a blow molded article with a smooth appearance and to the method of making the article. More particularly, the blow molding system of the present invention utilizes a thermal cycle to eliminate certain molding defects and a non-mirrored mold cavity surface to eliminate other molding defects. The thermal cycle sets the cavity temperature to a prescribed range to eliminate spot marks and line marks. The mold cavity surface has minute concavities/convexities and thereby produces an article with minute concavities/convexities such that when the article is painted, a smooth surface is produced without the need for sanding either the mold surface or the paint surface.

8 Claims, 5 Drawing Sheets

AUTOMOTIVE EXTERIOR PANEL

CROSS REFERENCE TO RELATED APPLICATIONS

This is a divisional application which claims priority under 35 U.S.C. §120 to application U.S. application Ser. No. 09/344,801, filed on Jun. 25, 1999 now U.S. Pat No. 6,458,312, and priority under 35 U.S.C. §119 to Japanese Patent Applications No. 10-199665 filed on Jun. 30, 1998, and No. 10-236485 filed on Aug. 7, 1998, which are incorporated herein by reference for all purposes.

BACKGROUND OF THE INVENTION

TECHNICAL FIELD OF THE INVENTION

The present invention relates to an automotive exterior panel having a good appearance and smooth finish and to a method for producing the panel.

Conventional methods for producing hollow molded articles having a smooth appearance disclose a method comprising disposing a parison, which is composed of a noncrystalline resin exhibiting a tensile modulus of 2000 Kg/cm² or more at 75° C., between mold halves having mirror-finished cavity surface, closing the mold and closely adhering the parison to the cavity by blowing a pressurizing air into the parison, wherein the parison is adhered to the cavity which is set to a cavity temperature Y° C. falling in the following range:

$$Y° C.=(0.96 X_0-37) \text{ to } (0.96 X_0+3)$$

where $X_0$ is a temperature at which the tensile modulus of the noncrystalline resin is 2000 Kg/cm² (Japanese Patent Application Publication (JP-B) No. 6-22875).

With this method it is impossible to avoid the formation of spot marks or line marks on the external surface of the hollow article of noncrystalline resin. Therefore, when producing an automotive exterior panel whose appearance needs to meet strict requirements, the spot marks and the line marks need to be removed by polishing or wet-sanding the external surface of the blow-molded hollow article of non-crystalline resin prior to the painting of the external surface. Consequently, the number of process steps increases and production costs become higher.

Another prior art method for thermoforming or blow molding a thermoplastic resin, is described in (JP-B No. 1-27849), wherein the gloss of the surface of the molded article is increased by heating selectively and instantly the mold surface to a temperature higher than the thermal deformation temperature of the resin by means of high frequency induction heating.

This method suffers has significant drawback, because it is necessary to use a special molding apparatus equipped with a mold heating device designed for the high frequency induction-heating. Consequently, the production costs become higher.

In (JP-B No. 2-40498), a method comprising blow-molding a molten parison, which has on the surface thereof many minute concavities/convexities having a depth in the range of from 2 to 100 μm, by means of a mold which is heated to a temperature higher than the crystallization temperature of the resin and the surface of which is mirror-finished to a roughness of 0.5 μm or less.

The melt fracture is generated on the parison surface so as to create many minute concavities/convexities having a depth in the range of from 2 to 100 μm. The depth of the minute concavities/convexities are difficult to control, and the resulting article has a certain amount of surface roughness even after painting. However, the control of the melt fracture is difficult and therefore is not suited for mass production.

What is needed is an article that can be produced efficiently and in mass production that has a smooth appearance once painted, suitable for an automobile exterior panel. The process used to create such a panel should eliminate line marks, spot marks, and air marks. The process should allow for mass production and produce a cost-effective product.

SUMMARY OF THE INVENTION

The present invention has been achieved in view of the above-described problems of conventional technologies. It therefore is an object of the present invention to provide an automotive exterior panel which has excellent mechanical strengths, such as rigidity, and which presents a good appearance, free of coating imperfections such as orange peel, and allow painting without prior polishing or wet-sanding of the external surface of the blow molded hollow article.

Another object of the present invention is to provide a method for producing an automotive exterior panel.

In order to achieve the object, the first automotive exterior panel according to the present invention is an automotive exterior panel which is a blow molded article of a noncrystalline resin exhibiting a tensile modulus of 2000 Kg/cm² or more at 75° C. and which is coated with a 15 to 150 μm thick paint film, wherein the panel to be coated has surface irregularities comprising a surface roughness in the range of from 0.9 to 9.0 μm and an average peak-to-peak distance in the range of from 10 to 150 μm.

In order to achieve the object, the second automotive exterior panel according to the present invention is an automotive exterior panel which is a blow molded article of a crystalline resin exhibiting a flexural modulus of 9000 Kg/cm² or more at 23° C. and which is coated with a 15 to 150 μm thick paint film, wherein the panel to be coated has surface irregularities comprising a surface roughness in the range of from 0.9 to 9.0 μm and an average peak-to-peak distance in the range of from 10 to 150 μm.

Further, in the second automotive exterior panel, the crystalline resin exhibiting a flexural modulus of 9000 Kg/cm² or more at 23° C. may be incorporated with 3% to 35% by weight of an inorganic filler.

Still further, in the second automotive exterior panel, the crystalline resin exhibiting a flexural modulus of 9000 Kg/cm² or more at 23° C. is preferably polypropylene.

The first method of the present invention for producing the automotive exterior panel comprises the steps of producing a hollow molded article for automotive exterior panel by blow molding and painting the external face of the hollow molded article for automotive exterior panel, wherein a parison, which is composed of a noncrystalline resin exhibiting a tensile modulus of 2000 Kg/cm² or more at 75° C., is disposed between mold halves having minute concavities/ convexities such that the surface roughness is in the range of from 0.9 to 9.0 μm and the average peak-to-peak distance is in the range of from 10 to 150 μm; the mold is then closed; and thereafter the parison is closely adhered by introducing thereinto a pressurized air to the cavity whose surface temperature is set to Y° C. which falls in the following range:

$$Y=(0.96X+3) \text{ to } (0.96X+40)$$

where X is a temperature at which the tensile modulus of the noncrystalline resin is 2000 Kg/cm$^2$.

In the first method of the present invention for producing the automotive exterior panel, it is effective to set the cavity surface temperature Z° C., at which a mold opening process is completed for taking out the molded article for automotive exterior panel, to a temperature in the range of Z≦0.9X where X is a temperature at which the tensile modulus of the noncrystalline resin is 2000 Kg/cm$^2$.

For clarity and understandability, the variables used for the noncrystalline resin are capital 'Y' and capital 'Z', while the variables used for the crystalline resin are lower case 'y' and lower case 'z'.

The second method of the present invention for producing the automotive exterior panel comprises the steps of producing a blow molded article for automotive exterior panel by blow molding and coating the external face of the molded article for automotive exterior panel with a 15 to 150 μm thick paint film, wherein a parison, which is composed of a crystalline resin exhibiting a flexural modulus of 9000 Kg/cm$^2$ or more at 23° C., is disposed between mold halves having minute concavities/convexities such that the surface roughness is in the range of from 0.9 to 9.0 μm and the average peak-to-peak distance is in the range of from 10 to 150 μm; the mold is then closed; and thereafter the parison is closely adhered by introducing therein a pressurized air to the cavity whose surface temperature is raised during the adhesion to y ° C. which falls in the following range:

$$A<y<1.07B$$

where A is a peak crystallization temperature (° C.) in a Differential Scanning Calorimetry (DSC) curve of the crystalline resin which exhibits a flexural modulus of 9000 Kg/cm$^2$ or more at 23° C.; and B is a peak fusion temperature (° C.) in a DSC curve of the crystalline resin which exhibits a flexural modulus of 9000 Kg/cm$^2$ or more at 23° C.

The third method of the present invention for producing the automotive exterior panel comprises the steps of producing a blow molded article for automotive exterior panel by blow molding and coating the external face of the molded article for automotive exterior panel with a 15 to 150 μm thick paint film, wherein a parison, which is composed of a crystalline resin exhibiting a flexural modulus of 9000 Kg/cm$^2$ or more at 23° C., is disposed between mold halves having minute concavities/convexities such that the surface roughness is in the range of from 0.9 to 9.0 μm and the average peak-to-peak distance is in the range of from 10 to 150 μm; a mold closing process is then started while raising the cavity surface temperature so as to reach a temperature y ° C. falling in the following range at a stage immediately before the closure of the mold:

$$A<y<1.07B$$

where A is a peak crystallization temperature (° C.) in a DSC curve of the crystalline resin which exhibits a flexural modulus of 9000 Kg/cm$^2$ or more at 23° C. while B is a peak fusion temperature (° C.) in a DSC curve of the crystalline resin which exhibits a flexural modulus of 9000 Kg/cm$^2$ or more at 23° C.; the mold is then completely closed; and thereafter the parison is closely adhered to the cavity by introducing a pressurized air into the parison.

In the second method and in the third method of the present invention for producing the automotive exterior panel, it is effective to incorporate 3% to 35% by weight of an inorganic filler into the crystalline resin that exhibits a flexural modulus of 9000 Kg/cm$^2$ or more at 23° C.

Further, in the second method and in the third method of the present invention for producing the automotive exterior panel, it is effective to choose a temperature in the range of z≦A−15 for the cavity surface temperature (z° C.) at which a mold opening process is started for taking out the molded article for automotive exterior panel.

Still other objects and advantages of the present invention will become readily apparent to those skilled in this art from the following detailed description, wherein only a preferred embodiment of the invention is described, simply by way of illustration of the best mode contemplated for carrying out the invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE PREFERRED EMBODIMENT

Figure 1A:
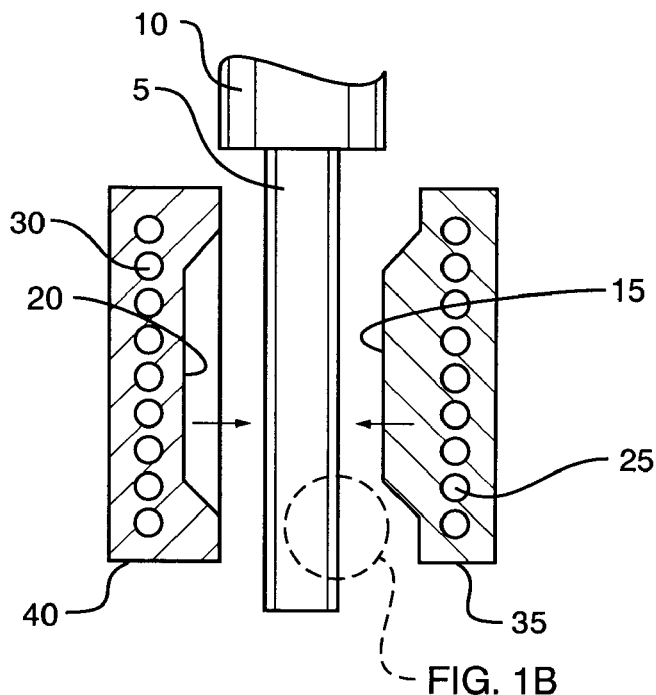
FIG. 1(a) is a diagrammatic cross-sectional view illustrating the state where a parison is extruded into the space between opened mold halves.

Spot marks and the line marks are created on the external face of blow molded hollow articles of resin according to the conventional prior art technologies, and are known to be caused by rough surface, die lines, and granular structures created on the external face of the parison.

The rough surface is caused by the flow of fused resin passing through the extrusion head when the parison is extruded and the rough surface is made up of irregular concave and convex portions having a height of about $2\,\mu m$ or greater.

The die line is caused by the junction of fused resin in the direction of flow thereof in the extrusion head when the parison is extruded and the die line is a streaky dent having a depth in the range of from 2 to 500 $\mu m$.

The granular structure is caused by an unmelted particle or carbide of resin and the granular structure is a 2 to 1000 $\mu m$ protrusion or dent on the external face of parison.

After extensive experimentation, the present inventors have found that the formation of spot marks and line marks, which appear on the external face of the molded article due to the presence of rough surface, die lines and granular structures on the external face of the parison, can be prevented by blow molding by the use of a mold having minute concavities/convexities comprising a specific surface roughness and average peak-to-peak distance and by carrying out the blow molding at a cavity surface temperature set to a specific temperature, instead of using a mold having a mirror-finished cavity surface.

This finding is a surprising fact from the standpoint of traditional knowledge, and this finding is important from two aspects. One aspect is that the problem of spot marks and line marks, which appear on the external face of the blow molded article due to the presence of rough surface, die lines and granular structures on the external face of the parison, can be eliminated by setting the cavity surface temperature to a specific temperature. The defects, such as spot marks and line marks, which are created on the parison surface when the parison is extruded, can be eliminated by raising the surface temperature of the parison to a specific temperature. In other words, because of the cavity surface temperature, the parison undergoes a kind of thermal treatment. As a result, the defects, such as spot marks and line marks, which cannot be eliminated by conventional technologies, can be eliminated as describe above. The thermal treatment can be analogized to ironing, wherein the heat takes wrinkles out of clothing.

Indeed, the defects, such as spot marks and line marks, which are created on the parison surface due to the presence of rough surface, die lines and granular structures on the external face of the parison, can be eliminated by a treatment which comprises raising the cavity surface temperature to a specific temperature. However, it has become clear that this treatment causes a crater-like defect, which is called an air mark, on the surface of the blow molded article. If the blow-molded article is painted without removing the air mark, the air mark is reflected to the paint film surface. Therefore, it is necessary to remove the air mark by polishing or wet-sanding prior to the application of paint, as hitherto practiced. In addition, it has become clear that the air marks are more concentrated on complicated portions of the blow molded article as the shape of the blow molded article becomes complicated. So while thermal treatment can eliminate spot marks and line marks, the air marks create a defective article.

It was revealed through research, that the formation of minute concavities/convexities on the cavity surface, in such a manner that the surface roughness is in the range of from 0.9 to 9.0 $\mu m$ and the average peak-to-peak distance is in the range of from 10 to 150 $\mu m$, prevents the formation of the air mark. And, it provides excellent surface results which make the polishing or wet-sanding unnecessary. This is true even if the surface roughness of the cavity is greater than the surface roughness of the parison. Specific minute concavities/convexities, particularly those whose average peak-to-peak distance is in the range of from 10 to 150 $\mu m$, have a beneficial effect on paint film. This is because, when the blow molded article is painted, the paint penetrates into the minute concavities/convexities by a uniform capillary action and thus provides a defect-free smooth painted surface. According to the measurement conducted by the present inventors, the surface roughness of the parison after extrusion thereof was 3 $\mu m$ and the average peak-to-peak distance was 539 $\mu m$. If the parison surface, whose average peak-to-peak distance is large despite the fairly small surface roughness, is not treated and is then painted, paint film defects such as orange peel emerge due to the emergence of the irregularities on the paint film because the peaks and valleys on the surface of the blow molded article cannot be fully covered and filled with the paint film.

Thus, the combination of the thermal treatment in conjunction with the prescribed surface roughness of the mold cavity eliminates the line marks, spot marks, and air marks and produce a quality appearance.

The present invention has been achieved based on the finding that the formation of spot marks and line marks, which appear on the external face of the blow molded article due to the presence of rough surface, die lines and annular structures on the external face of the parison, can be prevented by blow molding by the use of a mold having minute concavities/convexities comprising a specific surface roughness and average peak-to-peak distance and by carrying out the blow molding at cavity surface temperature set to a specific temperature, instead of using a mold having a mirror-finished cavity surface.

Accordingly, it has become clear that a beautiful paint film free of defects, such as orange peel, can be obtained if the substrate automotive exterior panel is an automotive exterior panel which is a hollow blow molded article of a noncrystalline resin exhibiting a tensile modulus of 2000 $Kg/cm^2$ or more at 75° C. and which is coated with a 15 to 150 $\mu m$ thick paint film, wherein the substrate surface to be coated has specific irregularities comprising a surface roughness in the range of from 0.9 to 9.0 $\mu m$ and an average peak-to-peak distance in the range of from 10 to 150 $\mu m$.

Further, it has become clear that a beautiful paint film free of defects, such as orange peel, can be obtained if the substrate automotive exterior panel is an automotive exterior panel which is a hollow blow molded article of a crystalline resin exhibiting a flexural modulus of 9000 $Kg/cm^2$ or more at 23° C. and which is coated with a 15 to 150 $\mu m$ thick paint film, wherein the substrate surface to be coated has specific irregularities comprising a surface roughness in the range of from 0.9 to 9.0 $\mu m$ and an average peak-to-peak distance in the range of from 10 to 150 μm. In addition, this automotive exterior panel was found to have the mechanical strengths, such as rigidity, which meet the requirement for automotive exterior panels.

In this case, if the crystalline resin exhibiting a flexural modulus of 9000 Kg/cm² or more at 23° C. is incorporated with 3% to 35% by weight of an inorganic filler, the parting lines, which emerge on the blow molded article for automotive exterior panel, can be easily eliminated by an ordinary treatment such as sanding. If the amount of the inorganic filler is less than 3% by weight, the surface of the molded article cannot be finished to the prescribed surface roughness because of the formation of, for example, splits when the parting lines are being eliminated by sanding or the like. On the contrary, if the amount of the inorganic filler is more than 35% by weight, the molded article becomes so hard that disadvantages, such as reduction in the smoothness of the paint film, reduction in formability and impairment of physical properties of the product emerge.

Figure 1B:
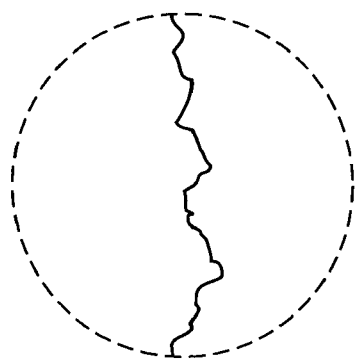
FIG. 1(b) is an exploded view of the surface of the parison, showing the rough surface.

In the prior art, as shown in FIG. 1(a), a parison 5, is extruded from an extrusion head 10 into the space between mold halves 35, 40. An exploded view of the parison surface is illustrated in FIG. 1(b). The rough surface, die lines, and granular structures are evident on the external face of the parison, which has irregular and relatively large concavities/convexities such that the surface roughness exceeds 10 μm and the peak-to-peak distance is exceeds 150 μm.

The rough surface is caused by the flow of fused resin passing through the extrusion head 10 when the parison 5 is extruded and the rough surface is made up of irregular concave and convex portions having a height of about 2 μm or greater. The die line is caused by the junction of fused resin in the direction of flow thereof in the extrusion head 10 when the parison 5 is extruded and the die line is a streaky dent having a depth in the range of from 2 to 500 μm. The granular structure is caused by an unmelted particle or carbide of resin and the granular structure is a 2 to 1000 μm protrusion or dent on the external face of parison 5.

Figure 2A:
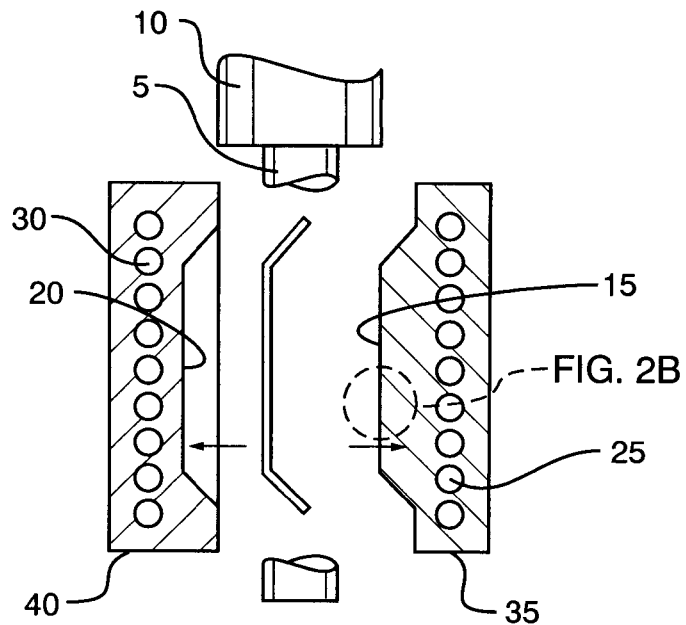
FIG. 2(a) is a diagrammatic cross-sectional view illustrating the state where mold is opened after a blow-molded article is produced
Figure 2B:
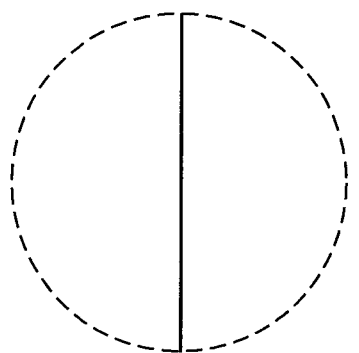
FIG. 2(b) is an exploded view of the cavity surface, showing the smooth surface.

Once the mold is closed, and the parison 5 is sandwiched between the mold halves 35, 40, a blow molded article 50 for an automotive exterior panel is produced, as shown in FIG. 2(a). The inner surface 15, 20 of mold halves 35, 40 have a mirror finish in the prior art, and the imperfections of the parison are transferred to the final product, resulting in spot marks and line marks. If the mold halves are properly treated with heating, the spot marks and line marks can be alleviated, but the heating process produces air marks, also resulting in unsatisfactory product.

Figure 3:
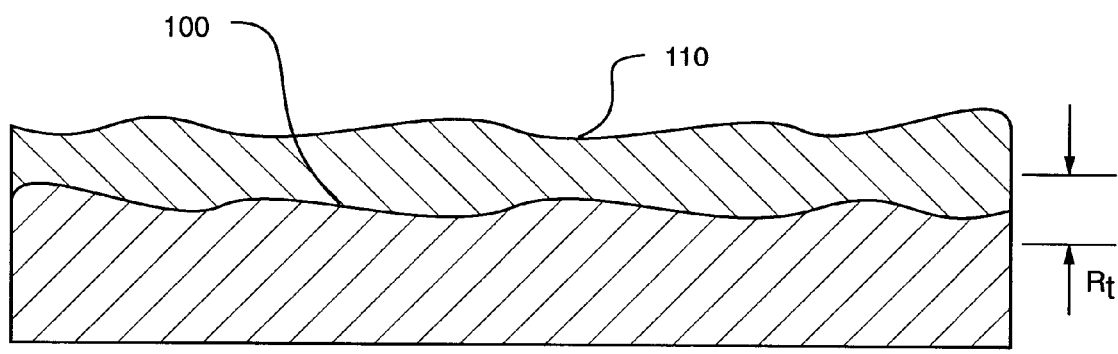
FIG. 3 is a view showing the prior art irregular surface after painting.

The prior art finished article 50 that results after the mold halves 35, 40 have compressed and released, produce an article with a rough surface as shown in FIG. 3, The paint surface 110 follows the rough and irregular mold surface 100 to produce an article of shoddy appearance. The mold surface and/or the paint surface can be sanded and produce a smoother appearance, but this is an extra process and significantly increases production costs.

The prior art also discusses using an irregular minute concavities/convexities having a depth in the range of from 2 to 100 μm, by means of a mold which is heated to a temperature higher than the crystallization temperature of the resin and the surface of which is mirror-finished to a roughness of 0.5 μm or less. The final product using this system is also not acceptable quality.

Figure 4:
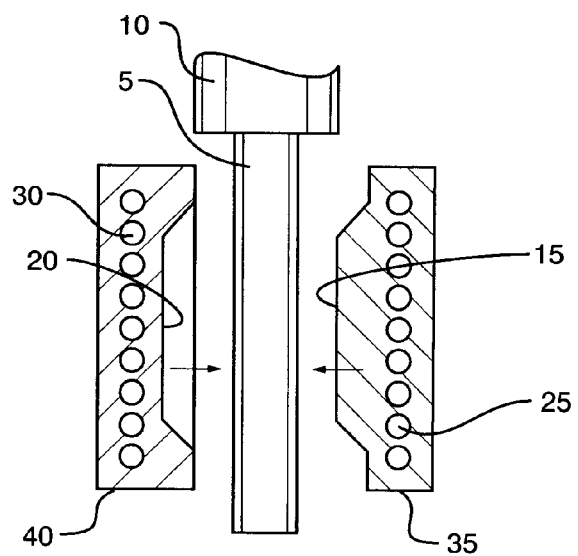
FIG. 4 is a diagrammatic cross-sectional view illustrating the state where a parison is extruded into the space between opened mold halves.

The present invention is shown in FIG. 4, where a parison 5, which is composed of a noncrystalline resin exhibiting a tensile modulus of 2000 Kg/cm² or more at 75° C., is extruded from an extrusion head 10 into the space between mold halves 35, 40.

Figure 5A:
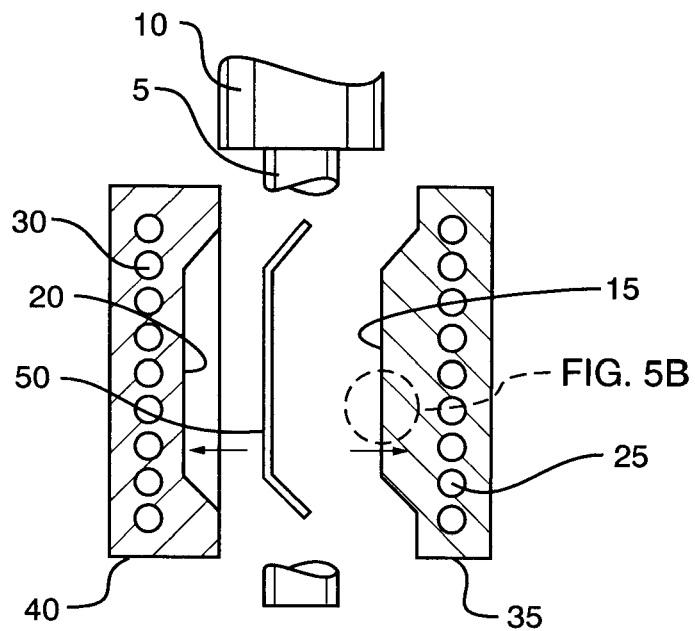
FIG. 5(a) is a diagrammatic cross-sectional view illustrating the state where a parison is extruded into the space between opened mold halves.

Once the mold is closed, and the parison 5 is sandwiched between the mold halves 35, 40. In FIG. 5(a), a blow molded article 50 is produced by a blow-molding operation comprising introducing pressurized air having a pressure of 7 Kg/cm² into the parison 5 through a blowing-in needle, which is not shown, so as to inflate the parison 5 to thereby cause the parison 5 to adhere to the cavities 15, 20.

Figure 5B:
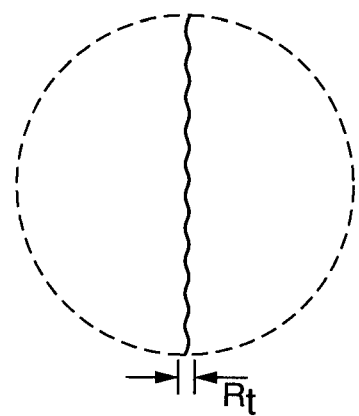
FIG. 5(b) is an exploded view of the surface of the cavities, showing the concavities/convexities.

An exploded view of the minute concavities/convexities of the inner cavities of the mold halves surface 15, 20 is illustrated in FIG. 5(b), with the minute concavities/convexities such that the surface roughness is in the range of from 0.9 to 9.0 μm and the average peak-to-peak distance is in the range of from 10 to 150 μm.

In this step, it is important to set the surface temperature Y° C. of the cavities 15, 20 to a temperature within the range Y=(0.96 X+3) to (0.96 X+40), by using a heating means which is transmitted through cavities or ducts 25, 30. The heating medium includes heated water, steam or an oil, where X° C. is a temperature at which the tensile modulus of the noncrystalline resin is 2000 Kg/cm², at the time when the parison 5 is adhered to the cavities 15, 20 or after the parison 5 is adhered to the cavities 15, 20.

Following the thermal process, a blow molded article 50 for automotive exterior panel is cooled in the mold halves 35, 40 and the mold is then opened as shown in FIG. 5(a). Next, the molded article 50 is taken out and unnecessary flushes are removed.

As a modified method for obtaining a molded article 50 for automotive exterior panel, which is free of deformation after release from the mold and which has a beautiful appearance, the cavity surface temperature Z° C., at which a mold opening process is completed for taking out the molded article for automotive exterior panel, is set to a temperature in the range of Z≦0.9X where X° C. is a temperature at which the tensile modulus of the noncrystalline resin is 2000 Kg/cm². Finally, a paint is applied to the external surface of the molded article 50 for automotive exterior panel to thereby produce a superior automotive exterior panel.

The details of the second embodiment of the method of the present invention for producing the automotive exterior panel described as follows. As shown in FIG. 4, a parison 5, which is composed of a crystalline resin exhibiting a flexural modulus of 9000 Kg/cm² or more at 23° C., is extruded from an extrusion head 2 into the space between mold halves 35, 40 whose cavities 15, 20 have minute concavities/convexities such that the surface roughness is in the range of from 0.9 to 9.0 μm and the peak-to-peak distance is in the range of from 10 to 150 μm.

The mold is closed, and the parison 5 is sandwiched between the mold halves 35, 40. Next, a blow molded article 50 for automotive exterior panel is produced by a blow molding operation comprising introducing pressurized air having a pressure of 7 Kg/cm² into the parison 5 through a blowing-in needle, which is not shown, so as to inflate the parison 5 to thereby cause the parison 5 to adhere to the cavities 15, 20.

In this step, the surface temperature y° C. of the cavities 15, 20, which hold the parison 5 adhered thereto, is raised to a temperature within the range A<y<1.07B by using a heating ducts 25, 30 which is provided in the cavities 35, 40 and which utilizes a heating means such as heated water, steam or a heated oil, where A is a peak crystallization temperature (° C.) in a DSC curve (defined at Japan Industrial Standard (JIS) K 7121) of the crystalline resin which exhibits a flexural modulus of 9000 Kg/cm² or more at 23° C.; and B is a peak fusion temperature (° C.) in a DSC curve (defined at JIS K 7121) of the crystalline resin which exhibits a flexural modulus of 9000 Kg/cm² or more at 23° C.

Next, a hollow molded article 50 for automotive exterior panel is cooled in the mold halves 35, 40 and the mold is then opened as shown in FIG. 5(*a*). Then, the blow molded article 50 is taken out and unnecessary flushes are removed.

In this step, a molded article 50 for automotive exterior panel, which is free of deformation after release from the mold and which has a beautiful appearance, can be obtained, if the cavity (15, 20) surface temperature z° C., at which a mold opening process is started for taking out the molded article for automotive exterior panel, is set to a temperature in the range of z≦A−15.

After removing the article, parting line portions are removed by sanding and thereafter a paint is applied at a thickness of from 15 to 150 μm to the external surface of the molded article 50 for automotive exterior panel to thereby produce a superior automotive exterior panel.

The details of the third embodiment of the method of the present invention for producing the automotive exterior panel are shown in FIG. 4, wherein a parison 5, which is composed of a crystalline resin which exhibits a flexural modulus of 9000 Kg/cm² or more at 23° C., is extruded from an extrusion head 10 into the space between mold halves 35, 40. The mold halves 35, 40 have cavities 15, 20 with minute concavities/convexities such that the surface roughness is in the range of from 0.9 to 9.0 μm and the average peak-to-peak distance is in the range of from 10 to 150 μm.

The mold halves 35, 40 are closed, and the mold is heated by using heating ducts 25, 30 so that the surface temperature y° C. of the cavities 15, 20 at the point immediately before the mold closure is a temperature within the range A<y<1.07B, where A is a peak crystallization temperature (° C.) in a DSC curve (defined at JIS K 7121) of the crystalline resin which exhibits a flexural modulus of 9000 Kg/cm² or more at 23° C.; and B is a peak fusion temperature (° C.) in a DSC curve (defined at JIS K 7121) of the crystalline resin which exhibits a flexural modulus of 9000 Kg/cm² or more at 23° C.

After the mold halves 35, 40 are closed, a hollow molded article 50 for automotive exterior panel is produced by a blow-molding process comprising introducing pressurized air having a pressure of 7 Kg/cm² into the parison 5 through a blowing-in needle, which is not shown, so as to inflate the parison 5 to thereby cause the parison 5 to adhere to the cavities 15, 20.

The hollow molded article 50 for automotive exterior panel is cooled in the mold halves 35, 40 and the mold is then opened as shown in FIG. 5(*a*). Next, the molded article 50 is taken out and unnecessary burrs are removed.

The molded article 50 for automotive exterior panel, which is free of deformation after release from the mold and which has a beautiful appearance, can be obtained if the cavity surface temperature z° C., at which a mold opening process is started for taking out the molded article for automotive exterior panel, is set to a temperature in the range of z≦A−15.

Any parting line portions are removed by sanding and thereafter paint is applied at a thickness of from 15 to 150 μm to the external surface of the molded article 50 for automotive exterior panel to thereby produce a superior automotive exterior panel.

Figure 6:
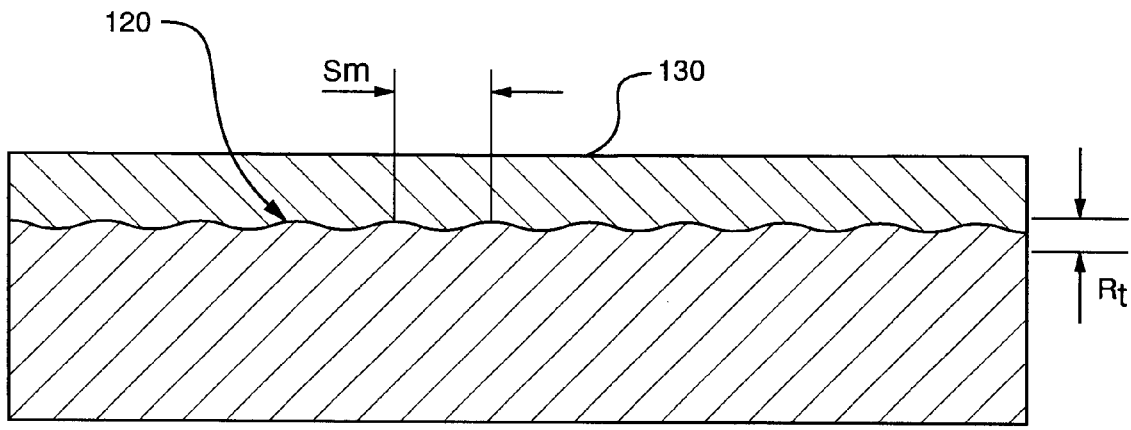
FIG. 6 is a view showing the smooth outer surface after painting.

The work product of the present method is shown in FIG. 6. The mold surface 120 has minute concavities/convexities such that the overall peak to valley distance (Rt) is less than 10 μm, and the peak-to-peak distance (Sm) is less than 150 μm. The paint surface 130 has a smooth surface that does not require any additional sanding. The smooth surface results from the present invention, wherein the paint fills in the minute concavities/convexities by a capillary action.

The term "automotive exterior panel" as used herein means a spoiler, a bumper, a trunk lid, a side mole, a fender, a bonnet, and the like, for which so-called good appearance, such as glossy surface, brilliant color, and the like, is strictly required.

In the present invention, the tensile strength refers to a value obtained by a tensile rate of 2 mm/minute by using a No. 2 type test piece in accordance with JIS K 7113. Even if the test pieces belong to the same noncrystalline resin, the tensile strength differs depending on the individual properties of resin for the test pieces. A noncrystalline resin, which exhibits a tensile modulus of 2000 Kg/cm² or more at 75° C. or preferably at 85° C. or above, is excellent in heat resistance. Examples of these resins include modified polyphenylene oxide, polycarbonate, noncrystalline polyamide, ABS resins, and polysulfone. Examples of a blend comprising a noncrystalline resin includes a blend of an ABS resin and polycarbonate.

In the present invention, the noncrystalline resin may be a blend of a noncrystalline resin and a crystalline resin wherein the noncrystalline component accounts for 30% by weight or more and wherein the blend exhibits a tensile modulus of 2000 Kg/cm² or more at 75° C. Examples of the blend of a noncrystalline resin and a crystalline resin include a blend of modified polyphenylene oxide and polyamide and a blend of polycarbonate and polybutylene terephthalate.

The flexural modulus at 23° C. in the present invention is a value obtained in accordance with JIS K 7171. A crystalline resin which exhibits a flexural modulus of 9000 Kg/cm² or more at 23° C. meets the mechanical strengths, such as rigidity, required for an automotive exterior panel. Examples of these resins include a single resin, such as polypropylene, high-density polyethylene, polyamide (e.g., nylon) and polybutylene-terephthalate; a blend (alloy) of a crystalline resin and a noncrystalline resin wherein the crystalline resin accounts for 30% by weight or more; and a blend (alloy) of these crystalline resins. Examples of a blend (alloy) of a crystalline resin and a noncrystalline resin include a polyamide-modified polyphenylene ether blend and a polypropylene-polystyrene blend. Examples of a blend (alloy) of crystalline resins include a polypropylene-polyethylene blend.

In the present invention, the peak crystallization temperature is a peak crystallization temperature in a DSC curve in accordance with JIS K 7121, and the peak fusion temperature is a peak fusion temperature in a DSC curve in accordance with JIS K 7121. In the case of a blend (alloy) of a crystalline resin and a noncrystalline resin, the peak crystallization temperature and the peak fusion temperature of the crystalline resin constituting the blend (alloy) are indicated as the peak crystallization temperature and the peak fusion temperature of the blend (alloy), respectively. In the case of a blend (alloy) of crystalline resins and noncrystalline resins, it has been found that the peak crystallization temperature and the peak fusion temperature, which are each sought from the additive average corresponding to the blending ratio of each crystalline resin, can serve as the peak crystallization temperature and the peak fusion temperature of the blend (alloy), respectively.

For example, the peak fusion temperature B of a blend resin, in which a crystalline resin (a) has a blending ratio of a % and a peak fusion temperature $t_1$, while other crystalline resin (b) has a peak fusion temperature $t_2$, is expressed as follows:

$$B=(a/100)t_1+(1-b/100)t_2$$

However, in the case where the peak fusion temperatures of the two crystalline resins (a) and (b) are so close to each other that the peaks in the DSC curves are not clearly differentiated from each other, the top of the peaks of the DSC curves was taken as the peak fusion temperature of the blend. In a similar way, the peak crystallization temperature can be obtained.

Table 1 shows the peak crystallization temperature and the peak fusion temperature of representative crystalline resins for use in the present invention.

TABLE 1

| CRYSTALLINE RESINS | PEAK CRYSTALLIZATION TEMPERATURE (° C.) A | PEAK FUSION TEMPERATURE (° C.) B |
|---|---|---|
| POLYPROPYLENE | 115 | 162 |
| HIGH-DENSITY POLYETHYLENE | 121 | 130 |
| POLYAMIDE (6 NYLON) | 192 | 222 |
| POLYBUTYLENE TEREPHTHALATE | 198 | 217 |

The surface irregularities formed on the outer face of blow molded automotive exterior panel and the minute concavities/convexities on the cavity of mold comprise a surface roughness in the range of from 0.9 to 9.0 μm, respectively. The surface roughness is based on maximum heights obtained by testing the surface of the cavity and blow molded article with an electrical roughness tester based on a needle tracer method (JIS B 0601), and more specifically, the surface roughness is calculated from the sum of the maximum height of the peak (convexity) and the maximum depth (concavity) of the irregularities on the outer face or on the minute concavities/convexities.

Since the surface of a blow molded article in particular often exhibits a gentle slope, the maximum height Rmax (JIS B 0601) of sectional-area curve is not used for expressing the surface roughness in the present invention. Instead, the present invention uses the sum of the maximum height of the peak (convexity) and the maximum depth (concavity), sought from the roughness curve (JIS B 0601), for expressing the surface roughness. In this case, the cut-off value of the roughness curve was 0.8 mm.

The average peak-to-peak distance of the irregularities formed on the outer face of the blow molded article for automotive exterior panel and the average peak-to-peak distance of the minute concavities/convexities of the cavity of mold for use in the present invention are in the range of from 10 to 150 μm. The average peak-to-peak distance is an average distance obtained by testing the surface of the cavity and blow molded article with an electrical roughness tester based on a needle tracer method. For the measurement, five sites were arbitrarily selected and the measurements were conducted for a breadth of 4 mm for each site.

The average peak-to-peak distance Sm is the average of distances between a peak point facing a valley and a next peak point facing a valley in cross sections traversing parallel lines in the portions for measurement cut out of a sectional-area curve (JIS B 0601). In this case, the multiplying factor in longitudinal relation to the roughness was 20000 or 10000, while the multiplying factor in transverse relation to the roughness was 50.

For the purpose of creating minute concavities/convexities having a surface roughness in the range of from 0.9 to 9.0 μm and an average peak-to-peak distance in the range of from 10 to 150 μm, an appropriate surface treatment is sand blasting by using sand having sizes in the range of from #150-grit to #1000-grit.

The application of paint to the external face of the molded article for automotive exterior panel is conducted by forming a 15 to 150 μm thick paint film by a conventional procedure using an air-spray gun. The paint adheres to the minute concavities/convexities through a capillary action and creates a smooth appearance.

EXAMPLES

In order to confirm the effects of the present invention, the following experiments were conducted, and the results are explained below.

Figure 7:
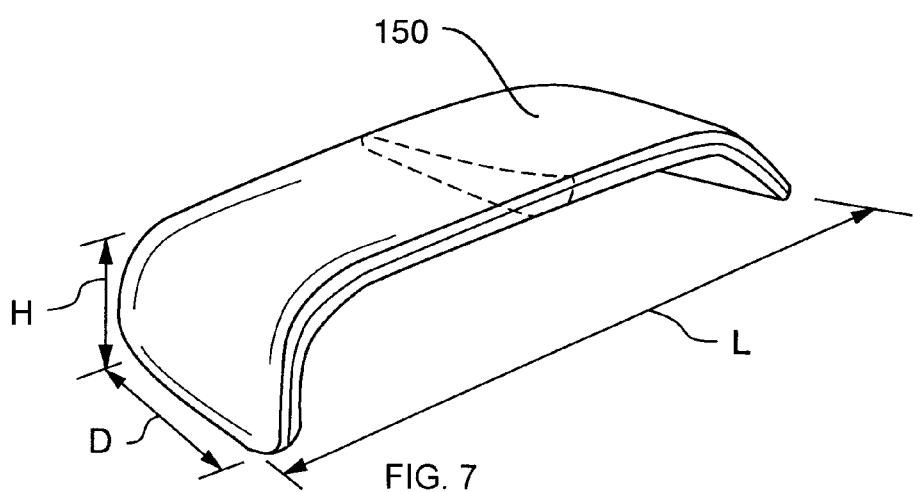
FIG. 7 is an oblique view illustrating a blow-molded article for a spoiler.

In the experiments, blow molded articles 150 for spoiler as shown in FIG. 7, each having a length L of 1200 mm, and a breadth D of 180 mm, a height H of 90 mm and an average wall thickness of 3 mm, were prepared by blow molding using a blow-molding machine equipped with an extruder having a screw whose diameter was 90 mm. Spoilers were prepared by painting the external face of the molded articles 150 for spoiler at a paint film thickness of 50 μm.

In Examples 1–5, minute concavities/convexities were formed on the cavity of a mold by sand blasting so that the surface roughness was 5.0 µm and the average peak-to-peak distance was 25 µm. A parison of an ABS resin (YM-254 having X of 105° C. and manufactured by Technopolymer Co., Ltd.) was extruded at 240° C. and samples were prepared by changing the cavity surface temperature.

Example 6 is a comparative example to be compared with Example 2. In Example 6, the procedure of Example 2 was repeated to prepare samples, except that the cavity of the mold used in Example 6 had a mirror-finished cavity surface.

In Example 7, Samples 1–9 were prepared by repeating the procedure of Example 2, except that the mold used in Example 7 had minute concavities/convexities on the cavity such that the surface roughness was 1.0 µm and the average peak-to-peak distance was 9.0 µm.

In Example 8, Samples 1–9 were prepared by repeating the procedure of Example 2, except that the mold used in Example 8 had minute concavities/convexities on the cavity such that the surface roughness was 1.0 µm and the average peak-to-peak distance was 10 µm.

In Example 9, Samples 1–9 were prepared by repeating the procedure of Example 2, except that the mold used in Example 9 had minute concavities/convexities on the cavity such that the surface roughness was 5.0 µm and the average peak-to-peak distance was 150 µm.

In Example 10, Samples 1–9 were prepared by repeating the procedure of Example 2, except that the mold used in Example 10 had minute concavities/convexities on the cavity such that the surface roughness was 5.0 µm and the average peak-to-peak distance was 160 µm.

In Example 11, Samples 1–9 were prepared by repeating the procedure of Example 2, except that the mold used in Example 11 had minute concavities/convexities on the cavity such that the surface roughness was 0.9 µm and the average peak-to-peak distance was 25 µm.

In Example 12, Samples 1–9 were prepared by repeating the procedure of Example 2, except that the mold used in Example 12 had minute concavities/convexities on the cavity such that the surface roughness was 0.8 µm and the average peak-to-peak distance was 25 µm.

In Examples 13–15, minute concavities/convexities were formed on the cavity of a mold by sand blasting so that the surface roughness was 5.0 µm and the average peak-to-peak distance was 25 µm. A parison of a modified PPO resin (Noryl EBM-9201 having X of 114° C. and manufactured by Japan GE Plastics Co., Ltd.) was extruded at 240° C. and samples were prepared by changing the cavity surface temperature.

In Examples 16–22, minute concavities/convexities were formed on the cavity of a mold by sand blasting so that the surface roughness was 5.0 µm and the average peak-to-peak distance was 25 µm. A parison made of a polypropylene resin (EC-9 having A of 11 5° C. and B of 162° C. and manufactured by Nippon Polychem Co., Ltd.) incorporated with 10% by weight of talc as an inorganic filler was extruded at 220° C. and samples were prepared by changing the cavity surface temperature.

In Example 23, Samples 1–9 were prepared by using a mold which had minute concavities/convexities on the cavity such that the surface roughness was 5.0 µm and the average peak-to-peak distance was 25 µm and by changing the content of the inorganic filler while keeping the cavity surface temperature constant.

In Example 24, Samples 1–9 were prepared by repeating the procedure of Example 20, except that the mold used in Example 24 had minute concavities/convexities on the cavity such that the surface roughness was 2.0 µm and the average peak-to-peak distance was 10 µm.

In Example 25, Samples 1–9 were prepared by repeating the procedure of Example 20, except that the mold used in Example 25 had minute concavities/convexities on the cavity such that the surface roughness was 1.0 µm and the average peak-to-peak distance was 10 µm.

In Example 26, Samples 1–9 were prepared by repeating the procedure of Example 20, except that the mold used in Example 26 had minute concavities/convexities on the cavity such that the surface roughness was 0.9 µm and the average peak-to-peak distance was 10 µm.

In Example 27, Samples 1–9 were prepared by repeating the procedure of Example 20, except that the mold used in Example 27 had minute concavities/convexities on the cavity such that the surface roughness was 0.8 µm and the average peak-to-peak distance was 10 µm.

In Example 28, Samples 1–9 were prepared by repeating the procedure of Example 20, except that the mold used in Example 28 had minute concavities/convexities on the cavity such that the surface roughness was 9.0 µm and the average peak-to-peak distance was 30 µm.

In Example 29, Samples 1–9 were prepared by repeating the procedure of Example 20, except that the mold used in Example 29 had minute concavities/convexities on the cavity such that the surface roughness was 10 µm and the average peak-to-peak distance was 30 µm.

In Example 30, Samples 1–9 were prepared by repeating the procedure of Example 20, except that the mold used in Example 30 had minute concavities/convexities on the cavity such that the surface roughness was 3.0 µm and the average peak-to-peak distance was 10 µm.

In Example 31, Samples 1–9 were prepared by repeating the procedure of Example 20, except that the mold used in Example 31 had minute concavities/convexities on the cavity such that the surface roughness was 3.0 µm and the average peak-to-peak distance was 9 µm.

In Example 32, Samples 1–9 were prepared by repeating the procedure of Example 20, except that the mold used in Example 32 had minute concavities/convexities on the cavity such that the surface roughness was 5.0 µm and the average peak-to-peak distance was 150 µm.

In Example 33, Samples 1–9 were prepared by repeating the procedure of Example 20, except that the mold used in Example 33 had minute concavities/convexities on the cavity such that the surface roughness was 5.0 µm and the average peak-to-peak distance was 160 µm.

In Example 34, minute concavities/convexities were formed on the cavity of a mold by sand blasting so that the surface roughness was 5.0 µm and the average peak-to-peak distance was 25 µm. Sample 1–9 were prepared by extruding a parison made of a polypropylene-high-density polyethylene blend resin at 210° C. and by changing the cavity surface temperature. The polypropylene-high-density polyethylene blend resin was prepared by blending polypropylene resin (EC-9 having A of 115° C. and B of 162° C. and manufactured by Nippon Polychem Co., Ltd.) and high-density polyethylene (B-970 having A of 121° C. and B of 130° C. and manufactured by Asahi Chemical Industry Co., Ltd.) at a ratio of 70:30. The peak temperatures of the blend resin were 116.8° C. for A and 152.4° C. for B.

In Example 35, Samples 1–9 were prepared by repeating the procedure of Example 34, except the content of the inorganic filler in Example 35 was changed while keeping the cavity surface temperature constant.

In Example 36, Samples 1–9 were prepared by repeating the procedure of Example 34, except that the mold used in Example 36 had minute concavities/convexities on the cavity such that the surface roughness was 2.0 μm and the average peak-to-peak distance was 10 m.

In Example 37, Samples 1–9 were prepared by repeating the procedure of Example 34, except that the mold used in Example 37 had minute concavities/convexities on the cavity such that the surface roughness was 1.0 μm and the average peak-to-peak distance was 10 μm.

In Example 38, Samples 1–9 were prepared by repeating the procedure of Example 34, except that the mold used in Example 38 had minute concavities/convexities on the cavity such that the surface roughness was 0.9 μm and the average peak-to-peak distance was 10 μm.

In Example 39, Samples 1–9 were prepared by repeating the procedure of Example 34, except that the mold used in Example 39 had minute concavities/convexities on the cavity such that the surface roughness was 0.8 μm and the average peak-to-peak distance was 10 μm.

In Example 40, Samples 1–9 were prepared by repeating the procedure of Example 34, except that the mold used in Example 40 had minute concavities/convexities on the cavity such that the surface roughness was 9.0 μm and the average peak-to-peak distance was 30 μm.

In Example 41, Samples 1–9 were prepared by repeating the procedure of Example 34, except that the mold used in Example 41 had minute concavities/convexities on the cavity such that the surface roughness was 10 μm and the average peak-to-peak distance was 30 μm.

In Example 42, Samples 1–9 were prepared by repeating the procedure of Example 34, except that the mold used in Example 42 had minute concavities/convexities on the cavity such that the surface roughness was 3.0 μm and the average peak-to-peak distance was 9 μm.

In Example 43, Samples 1–9 were prepared by repeating the procedure of Example 34, except that the mold used in Example 43 had minute concavities/convexities on the cavity such that the surface roughness was 3.0 μm and the average peak-to-peak distance was 10 μm.

In Example 44, Samples 1–9 were prepared by repeating the procedure of Example 34, except that the mold used in Example 44 had minute concavities/convexities on the cavity such that the surface roughness was 5.0 μm and the average peak-to-peak distance was 150 μm.

In Example 45, Samples 1–9 were prepared by repeating the procedure of Example 34, except that the mold used in Example 45 had minute concavities/convexities on the cavity such that the surface roughness was 5.0 μm and the average peak-to-peak distance was 160 μm.

The evaluation results of Examples 1–45 are shown in Tables 2-1–Tables 2-45.

In Tables 2-1–Tables 2-45, evaluation criteria are as follows:

In the tables:

Rt—indicates the surface roughness in μm;
Sm—indicates an average peak-to-peak distance in μm of the irregularities on the surface of molded articles.

Note: Deformation, surface condition, air marks, die lines, and bits were visually inspected after blow molding but before painting the molded articles.

Deformation

NONE: no deformation observed
SOME: slight deformation but judged as acceptable
YES: deformation observed Surface condition NONE: no shark skin irregularities observed on the surface and the surface is uniform
SOME: slight shark skin irregularities observed on the surface
YES: remarkable shark skin irregularities observed on the surface Air marks NONE: no air mark observed
SOME: almost no air mark observed
YES: air mark observed Die lines NONE no die line observed
SOME: almost no die line observed
YES: die lines observed Bits NONE: no bits observed
SOME: almost no bits observed
YES: bits observed Appearance of paint film NONE: no orange peel observed
SOME: slight orange peel observed
YES: orange peel observed

TABLE 2-1

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 1-1 | 60 | 70 | 140 | NONE | YES | NONE | YES | YES | 6.4 | 190 | YES |
| Example 1-2 | 60 | 80 | 140 | NONE | YES | NONE | YES | YES | 5.8 | 188 | YES |
| Example 1-3 | 60 | 90 | 140 | NONE | YES | NONE | YES | YES | 5.4 | 185 | SOME |
| Example 1-4 | 60 | 100 | 140 | NONE | YES | NONE | YES | YES | 5.3 | 158 | SOME |
| Example 1-5 | 60 | 105 | 140 | NONE | SOME | NONE | NONE | SOME | 4.9 | 148 | NONE |
| Example 1-6 | 60 | 115 | 140 | NONE | NONE | NONE | NONE | NONE | 5.2 | 124 | NONE |
| Example 1-7 | 60 | 125 | 140 | NONE | NONE | NONE | NONE | NONE | 5.0 | 70 | NONE |
| Example 1-8 | 60 | 135 | 150 | NONE | NONE | NONE | NONE | NONE | 4.9 | 66 | NONE |
| Example 1-9 | 60 | 145 | 180 | NONE | NONE | NONE | NONE | NONE | 5.1 | 25 | NONE |

TABLE 2-2

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 2-1 | 70 | 70 | 120 | NONE | YES | NONE | YES | YES | 5.8 | 210 | YES |
| Example 2-2 | 70 | 80 | 120 | NONE | YES | NONE | YES | YES | 6.1 | 204 | YES |
| Example 2-3 | 70 | 90 | 120 | NONE | YES | NONE | YES | YES | 5.4 | 182 | YES |
| Example 2-4 | 70 | 100 | 120 | NONE | YES | NONE | YES | YES | 5.2 | 160 | SOME |
| Example 2-5 | 70 | 105 | 120 | NONE | SOME | NONE | NONE | SOME | 5.4 | 141 | NONE |
| Example 2-6 | 70 | 115 | 120 | NONE | NONE | NONE | NONE | NONE | 4.9 | 110 | NONE |
| Example 2-7 | 70 | 125 | 120 | NONE | NONE | NONE | NONE | NONE | 5.0 | 60 | NONE |
| Example 2-8 | 70 | 135 | 140 | NONE | NONE | NONE | NONE | NONE | 4.8 | 45 | NONE |
| Example 2-9 | 70 | 145 | 160 | NONE | NONE | NONE | NONE | NONE | 5.0 | 24 | NONE |

TABLE 2-3

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 3-1 | 80 | 80 | 120 | NONE | YES | NONE | YES | YES | 5.6 | 191 | YES |
| Example 3-2 | 80 | 90 | 120 | NONE | YES | NONE | YES | YES | 5.8 | 175 | SOME |
| Example 3-3 | 80 | 100 | 120 | NONE | YES | NONE | SOME | YES | 6.1 | 154 | SOME |
| Example 3-4 | 80 | 105 | 120 | NONE | SOME | NONE | NONE | NONE | 5.4 | 138 | NONE |
| Example 3-5 | 80 | 115 | 120 | NONE | NONE | NONE | NONE | NONE | 5.2 | 60 | NONE |
| Example 3-6 | 80 | 125 | 120 | NONE | NONE | NONE | NONE | NONE | 4.9 | 32 | NONE |
| Example 3-7 | 80 | 135 | 130 | NONE | NONE | NONE | NONE | NONE | 5.0 | 28 | NONE |
| Example 3-8 | 80 | 145 | 150 | NONE | NONE | NONE | NONE | NONE | 5.0 | 25 | NONE |

TABLE 2-4

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 4-1 | 90 | 90 | 120 | NONE | SOME | NONE | YES | YES | 5.5 | 178 | YES |
| Example 4-2 | 90 | 100 | 120 | NONE | SOME | NONE | SOME | SOME | 5.8 | 168 | SOME |
| Example 4-3 | 90 | 105 | 120 | NONE | SOME | NONE | NONE | NONE | 5.7 | 134 | NONE |
| Example 4-4 | 90 | 115 | 120 | NONE | NONE | NONE | NONE | NONE | 5.3 | 75 | NONE |
| Example 4-5 | 90 | 125 | 130 | NONE | NONE | NONE | NONE | NONE | 5.2 | 35 | NONE |
| Example 4-6 | 90 | 135 | 150 | NONE | NONE | NONE | NONE | NONE | 5.2 | 27 | NONE |
| Example 4-7 | 90 | 145 | 175 | NONE | NONE | NONE | NONE | NONE | 5.2 | 26 | NONE |

TABLE 2-5

| Example | Temperature of Cavity Z | Temperature of Cavity Y | Molding Time Second | Evaluation Deformation | Evaluation Surface Condition | Evaluation Air Mark | Evaluation Die Line | Evaluation Bit | Evaluation Rt | Evaluation Sm | Appearance of Paint Film |
|---|---|---|---|---|---|---|---|---|---|---|---|
| Example 5-1 | 95 | 100 | 130 | YES | SOME | NONE | SOME | YES | 5.3 | 158 | YES |
| Example 5-2 | 95 | 105 | 130 | YES | SOME | NONE | NONE | SOME | 5.6 | 125 | NONE |
| Example 5-3 | 95 | 115 | 160 | YES | SOME | NONE | NONE | NONE | 5.4 | 84 | NONE |
| Example 5-4 | 95 | 125 | 190 | YES | NONE | NONE | NONE | NONE | 5.2 | 45 | NONE |
| Example 5-5 | 95 | 135 | 200 | YES | NONE | NONE | NONE | NONE | 5.0 | 32 | NONE |
| Example 5-6 | 95 | 145 | 200 | YES | NONE | NONE | NONE | NONE | 4.9 | 28 | NONE |

TABLE 2-6

| Example | Temperature of Cavity Z | Temperature of Cavity Y | Molding Time Second | Evaluation Deformation | Evaluation Surface Condition | Evaluation Air Mark | Evaluation Die Line | Evaluation Bit | Evaluation Rt | Evaluation Sm | Appearance of Paint Film |
|---|---|---|---|---|---|---|---|---|---|---|---|
| Example 6-1 | 70 | 70 | 120 | NONE | YES | NONE | YES | YES | 5.4 | 185 | YES |
| Example 6-2 | 70 | 80 | 120 | NONE | YES | NONE | YES | YES | 5.2 | 176 | YES |
| Example 6-3 | 70 | 90 | 120 | NONE | YES | NONE | YES | YES | 4.2 | 170 | YES |
| Example 6-4 | 70 | 100 | 120 | NONE | YES | NONE | YES | YES | 2.4 | 168 | YES |
| Example 6-5 | 70 | 105 | 120 | NONE | SOME | NONE | NONE | SOME | 1.9 | 146 | SOME |
| Example 6-6 | 70 | 115 | 120 | NONE | NONE | SOME | NONE | NONE | 1.2 | 194 | SOME |
| Example 6-7 | 70 | 125 | 120 | NONE | NONE | SOME | NONE | NONE | 0.9 | 222 | SOME |
| Example 6-8 | 70 | 135 | 140 | NONE | NONE | YES | NONE | NONE | 0.6 | 201 | YES |
| Example 6-9 | 70 | 145 | 160 | NONE | NONE | YES | NONE | NONE | 0.6 | 176 | YES |

TABLE 2-7

| Example | Temperature of Cavity Z | Temperature of Cavity Y | Molding Time Second | Evaluation Deformation | Evaluation Surface Condition | Evaluation Air Mark | Evaluation Die Line | Evaluation Bit | Evaluation Rt | Evaluation Sm | Appearance of Paint Film |
|---|---|---|---|---|---|---|---|---|---|---|---|
| Example 7-1 | 70 | 70 | 120 | NONE | YES | NONE | YES | YES | 5.8 | 196 | YES |
| Example 7-2 | 70 | 80 | 120 | NONE | YES | NONE | YES | YES | 5.4 | 199 | YES |
| Example 7-3 | 70 | 90 | 120 | NONE | YES | NONE | YES | YES | 6.0 | 182 | YES |
| Example 7-4 | 70 | 100 | 120 | NONE | YES | NONE | YES | YES | 5.8 | 168 | YES |
| Example 7-5 | 70 | 105 | 120 | NONE | SOME | NONE | NONE | SOME | 5.9 | 125 | SOME |
| Example 7-6 | 70 | 115 | 120 | NONE | NONE | SOME | NONE | SOME | 5.5 | 69 | SOME |
| Example 7-7 | 70 | 125 | 120 | NONE | NONE | SOME | NONE | NONE | 5.4 | 48 | SOME |
| Example 7-8 | 70 | 135 | 140 | NONE | NONE | SOME | NONE | NONE | 3.6 | 28 | SOME |
| Example 7-9 | 70 | 145 | 160 | NONE | NONE | SOME | NONE | NONE | 1.2 | 10.5 | SOME |

TABLE 2-8

| Example | Temperature of Cavity Z | Temperature of Cavity Y | Molding Time Second | Evaluation Deformation | Evaluation Surface Condition | Evaluation Air Mark | Evaluation Die Line | Evaluation Bit | Evaluation Rt | Evaluation Sm | Condition of Coated Surface |
|---|---|---|---|---|---|---|---|---|---|---|---|
| Example 8-1 | 70 | 70 | 120 | NONE | YES | NONE | YES | YES | 6.0 | 207 | YES |
| Example 8-2 | 70 | 80 | 120 | NONE | YES | NONE | YES | YES | 5.5 | 200 | YES |
| Example 8-3 | 70 | 90 | 120 | NONE | YES | NONE | YES | YES | 5.4 | 188 | YES |
| Example 8-4 | 70 | 100 | 120 | NONE | YES | NONE | YES | YES | 5.9 | 159 | YES |
| Example 8-5 | 70 | 105 | 120 | NONE | SOME | NONE | NONE | SOME | 6.4 | 124 | SOME |
| Example 8-6 | 70 | 115 | 120 | NONE | NONE | SOME | NONE | SOME | 5.4 | 69 | SOME |
| Example 8-7 | 70 | 125 | 120 | NONE | NONE | SOME | NONE | NONE | 4.8 | 45 | SOME |
| Example 8-8 | 70 | 135 | 140 | NONE | NONE | SOME | NONE | NONE | 1.8 | 24 | SOME |
| Example 8-9 | 70 | 145 | 160 | NONE | NONE | SOME | NONE | NONE | 1.2 | 10.6 | SOME |

TABLE 2-9

| Example | Temperature of Cavity Z | Temperature of Cavity Y | Molding Time Second | Evaluation Deformation | Surface Condition | Air Mark | Die Line | Bit | Rt | Sm | Appearance of Paint Film |
|---|---|---|---|---|---|---|---|---|---|---|---|
| Example 9-1 | 70 | 70 | 120 | NONE | YES | NONE | YES | YES | 5.8 | 202 | YES |
| Example 9-2 | 70 | 80 | 120 | NONE | YES | NONE | YES | YES | 6.1 | 180 | YES |
| Example 9-3 | 70 | 90 | 120 | NONE | YES | NONE | YES | YES | 5.9 | 175 | YES |
| Example 9-4 | 70 | 100 | 120 | NONE | YES | NONE | YES | YES | 6.4 | 165 | YES |
| Example 9-5 | 70 | 105 | 120 | NONE | SOME | NONE | NONE | SOME | 5.6 | 158 | SOME |
| Example 9-6 | 70 | 115 | 120 | NONE | NONE | NONE | NONE | NONE | 6.2 | 155 | SOME |
| Example 9-7 | 70 | 125 | 120 | NONE | NONE | SOME | NONE | NONE | 5.8 | 153 | SOME |
| Example 9-8 | 70 | 135 | 140 | NONE | NONE | SOME | NONE | NONE | 5.0 | 156 | SOME |
| Example 9-9 | 70 | 145 | 160 | NONE | NONE | SOME | NONE | NONE | 4.9 | 154 | SOME |

TABLE 2-10

| Example | Temperature of Cavity Z | Temperature of Cavity Y | Molding Time Second | Evaluation Deformation | Surface Condition | Air Mark | Die Line | Bit | Rt | Sm | Appearance of Paint Film |
|---|---|---|---|---|---|---|---|---|---|---|---|
| Example 10-1 | 70 | 70 | 120 | NONE | YES | NONE | YES | YES | 6.1 | 200 | YES |
| Example 10-2 | 70 | 80 | 120 | NONE | YES | NONE | YES | YES | 5.9 | 198 | YES |
| Example 10-3 | 70 | 90 | 120 | NONE | YES | NONE | YES | YES | 5.4 | 195 | YES |
| Example 10-4 | 70 | 100 | 120 | NONE | YES | NONE | YES | YES | 6.8 | 186 | YES |
| Example 10-5 | 70 | 105 | 120 | NONE | SOME | NONE | NONE | SOME | 5.4 | 188 | YES |
| Example 10-6 | 70 | 115 | 120 | NONE | NONE | NONE | NONE | NONE | 6.4 | 173 | YES |
| Example 10-7 | 70 | 125 | 120 | NONE | NONE | SOME | NONE | NONE | 5.8 | 168 | YES |
| Example 10-8 | 70 | 135 | 140 | NONE | NONE | NONE | NONE | NONE | 4.9 | 164 | YES |
| Example 10-9 | 70 | 145 | 160 | NONE | NONE | NONE | NONE | NONE | 5.2 | 160 | YES |

TABLE 2-11

| Example | Temperature of Cavity Z | Temperature of Cavity Y | Molding Time Second | Evaluation Deformation | Surface Condition | Air Mark | Die Line | Bit | Rt | Sm | Appearance of Paint Film |
|---|---|---|---|---|---|---|---|---|---|---|---|
| Example 11-1 | 70 | 70 | 120 | NONE | YES | NONE | YES | YES | 5.3 | 198 | YES |
| Example 11-2 | 70 | 80 | 120 | NONE | YES | NONE | YES | YES | 5.1 | 192 | YES |
| Example 11-3 | 70 | 90 | 120 | NONE | YES | NONE | YES | YES | 4.8 | 176 | YES |
| Example 11-4 | 70 | 100 | 120 | NONE | YES | NONE | YES | YES | 3.1 | 154 | YES |
| Example 11-5 | 70 | 105 | 120 | NONE | SOME | NONE | NONE | SOME | 1.9 | 130 | SOME |
| Example 11-6 | 70 | 115 | 120 | NONE | NONE | NONE | NONE | NONE | 1.0 | 65 | NONE |
| Example 11-7 | 70 | 125 | 120 | NONE | NONE | NONE | NONE | NONE | 0.9 | 32 | NONE |
| Example 11-8 | 70 | 135 | 140 | NONE | NONE | SOME | NONE | NONE | 0.8 | 27 | SOME |
| Example 11-9 | 70 | 145 | 160 | NONE | NONE | SOME | NONE | NONE | 0.9 | 25 | SOME |

TABLE 2-12

| Example | Temperature of Cavity Z | Temperature of Cavity Y | Molding Time Second | Evaluation Deformation | Surface Condition | Air Mark | Die Line | Bit | Rt | Sm | Appearance of Paint Film |
|---|---|---|---|---|---|---|---|---|---|---|---|
| Example 12-1 | 70 | 70 | 120 | NONE | YES | NONE | YES | YES | 5.4 | 197 | YES |
| Example 12-2 | 70 | 80 | 120 | NONE | YES | NONE | YES | YES | 5.1 | 191 | YES |
| Example 12-3 | 70 | 90 | 120 | NONE | YES | NONE | YES | YES | 4.2 | 169 | YES |
| Example 12-4 | 70 | 100 | 120 | NONE | YES | NONE | YES | YES | 2.4 | 155 | YES |
| Example 12-5 | 70 | 105 | 120 | NONE | SOME | NONE | NONE | SOME | 1.9 | 129 | SOME |

TABLE 2-12-continued

| Example | Temperature of Cavity Z | Temperature of Cavity Y | Molding Time Second | Evaluation Deformation | Evaluation Surface Condition | Evaluation Air Mark | Evaluation Die Line | Evaluation Bit | Evaluation Rt | Evaluation Sm | Appearance of Paint Film |
|---|---|---|---|---|---|---|---|---|---|---|---|
| Example 12-6 | 70 | 115 | 120 | NONE | NONE | SOME | NONE | SOME | 1.5 | 84 | SOME |
| Example 12-7 | 70 | 125 | 120 | NONE | NONE | SOME | NONE | NONE | 0.8 | 36 | SOME |
| Example 12-8 | 70 | 135 | 140 | NONE | NONE | SOME | NONE | NONE | 0.7 | 27 | SOME |
| Example 12-9 | 70 | 145 | 160 | NONE | NONE | YES | NONE | NONE | 0.8 | 25 | YES |

TABLE 2-13

| Example | Temperature of Cavity Z | Temperature of Cavity Y | Molding Time Second | Evaluation Deformation | Evaluation Surface Condition | Evaluation Air Mark | Evaluation Die Line | Evaluation Bit | Evaluation Rt | Evaluation Sm | Appearance of Paint Film |
|---|---|---|---|---|---|---|---|---|---|---|---|
| Example 13-1 | 90 | 100 | 120 | NONE | YES | NONE | YES | YES | 12.0 | 289 | YES |
| Example 13-2 | 90 | 105 | 120 | NONE | YES | NONE | YES | YES | 8.6 | 260 | YES |
| Example 13-3 | 90 | 110 | 120 | NONE | SOME | NONE | NONE | SOME | 5.8 | 190 | YES |
| Example 13-4 | 90 | 115 | 120 | NONE | NONE | NONE | NONE | NONE | 5.4 | 149 | NONE |
| Example 13-5 | 90 | 120 | 120 | NONE | NONE | NONE | NONE | NONE | 5.2 | 76 | NONE |
| Example 13-6 | 90 | 130 | 120 | NONE | NONE | NONE | NONE | NONE | 4.9 | 40 | NONE |
| Example 13-7 | 90 | 140 | 140 | NONE | NONE | NONE | NONE | NONE | 5.0 | 35 | NONE |
| Example 13-8 | 90 | 150 | 160 | NONE | NONE | NONE | NONE | NONE | 5.1 | 28 | NONE |
| Example 13-9 | 90 | 170 | 180 | NONE | NONE | NONE | NONE | NONE | 5.0 | 26 | NONE |

TABLE 2-14

| Example | Temperature of Cavity Z | Temperature of Cavity Y | Molding Time Second | Evaluation Deformation | Evaluation Surface Condition | Evaluation Air Mark | Evaluation Die Line | Evaluation Bit | Evaluation Rt | Evaluation Sm | Appearance of Paint Film |
|---|---|---|---|---|---|---|---|---|---|---|---|
| Example 14-1 | 80 | 90 | 120 | NONE | YES | NONE | YES | YES | 12.4 | 304 | YES |
| Example 14-2 | 80 | 100 | 120 | NONE | YES | NONE | YES | YES | 9.4 | 296 | YES |
| Example 14-3 | 80 | 105 | 120 | NONE | YES | NONE | NONE | SOME | 7.0 | 234 | YES |
| Example 14-4 | 80 | 110 | 120 | NONE | SOME | NONE | NONE | NONE | 6.0 | 182 | NONE |
| Example 14-5 | 80 | 115 | 120 | NONE | SOME | NONE | NONE | NONE | 5.6 | 140 | NONE |
| Example 14-6 | 80 | 120 | 120 | NONE | NONE | NONE | NONE | NONE | 5.2 | 78 | NONE |
| Example 14-7 | 80 | 130 | 140 | NONE | NONE | NONE | NONE | NONE | 5.0 | 42 | NONE |
| Example 14-8 | 80 | 140 | 160 | NONE | NONE | NONE | NONE | NONE | 4.9 | 31 | NONE |
| Example 14-9 | 80 | 150 | 180 | NONE | NONE | NONE | NONE | NONE | 5.0 | 25 | NONE |

TABLE 2-15

| Example | Temperature of Cavity Z | Temperature of Cavity Y | Molding Time Second | Evaluation Deformation | Evaluation Surface Condition | Evaluation Air Mark | Evaluation Die Line | Evaluation Bit | Evaluation Rt | Evaluation Sm | Appearance of Paint Film |
|---|---|---|---|---|---|---|---|---|---|---|---|
| Example 15-1 | 70 | 80 | 120 | NONE | YES | NONE | YES | YES | 11.8 | 306 | YES |
| Example 15-2 | 70 | 90 | 120 | NONE | YES | NONE | YES | YES | 10.4 | 298 | YES |
| Example 15-3 | 70 | 100 | 120 | NONE | YES | NONE | YES | YES | 7.6 | 292 | YES |
| Example 15-4 | 70 | 105 | 120 | NONE | YES | NONE | SOME | YES | 6.9 | 210 | YES |
| Example 15-5 | 70 | 110 | 120 | NONE | SOME | NONE | NONE | NONE | 6.0 | 194 | SOME |
| Example 15-6 | 70 | 115 | 120 | NONE | NONE | NONE | NONE | NONE | 5.5 | 149 | NONE |
| Example 15-7 | 70 | 120 | 135 | NONE | NONE | NONE | NONE | NONE | 5.0 | 74 | NONE |
| Example 15-8 | 70 | 130 | 160 | NONE | NONE | NONE | NONE | NONE | 5.1 | 36 | NONE |
| Example 15-9 | 70 | 140 | 180 | NONE | NONE | NONE | NONE | NONE | 4.9 | 29 | NONE |

TABLE 2-16

| Example | Temperature of Cavity Z | Temperature of Cavity Y | Molding Time Second | Evaluation Deformation | Evaluation Surface Condition | Evaluation Air Mark | Evaluation Die Line | Evaluation Bit | Rt | Sm | Appearance of Paint Film |
|---|---|---|---|---|---|---|---|---|---|---|---|
| Example 16-1 | 5 | 110 | 240 | NONE | YES | NONE | YES | YES | 13.8 | 202 | YES |
| Example 16-2 | 5 | 115 | 240 | NONE | SOME | NONE | SOME | SOME | 8.6 | 150 | SOME |
| Example 16-3 | 5 | 120 | 240 | NONE | SOME | NONE | SOME | SOME | 7.6 | 136 | SOME |
| Example 16-4 | 5 | 130 | 240 | NONE | SOME | NONE | NONE | NONE | 6.3 | 65 | NONE |
| Example 16-5 | 5 | 140 | 260 | NONE | SOME | NONE | NONE | NONE | 5.7 | 32 | NONE |
| Example 16-6 | 5 | 150 | 260 | NONE | NONE | NONE | NONE | NONE | 5.2 | 30 | NONE |
| Example 16-7 | 5 | 160 | 280 | NONE | NONE | NONE | NONE | NONE | 5.0 | 26 | NONE |
| Example 16-8 | 5 | 170 | 280 | NONE | NONE | NONE | NONE | NONE | 5.3 | 26 | NONE |
| Example 16-9 | 5 | 175 | 300 | NONE | NONE | NONE | NONE | NONE | 5.1 | 27 | NONE |

TABLE 2-17

| Example | Temperature of Cavity Z | Temperature of Cavity Y | Molding Time Second | Evaluation Deformation | Evaluation Surface Condition | Evaluation Air Mark | Evaluation Die Line | Evaluation Bit | Rt | Sm | Appearance of Paint Film |
|---|---|---|---|---|---|---|---|---|---|---|---|
| Example 17-1 | 20 | 110 | 240 | NONE | YES | NONE | YES | YES | 14.1 | 210 | YES |
| Example 17-2 | 20 | 115 | 240 | NONE | SOME | NONE | SOME | SOME | 8.8 | 148 | SOME |
| Example 17-3 | 20 | 120 | 240 | NONE | SOME | NONE | SOME | SOME | 6.8 | 124 | SOME |
| Example 17-4 | 20 | 130 | 240 | NONE | SOME | NONE | NONE | NONE | 6.0 | 82 | NONE |
| Example 17-5 | 20 | 140 | 260 | NONE | SOME | NONE | NONE | NONE | 5.5 | 46 | NONE |
| Example 17-6 | 20 | 150 | 260 | NONE | NONE | NONE | NONE | NONE | 5.3 | 32 | NONE |
| Example 17-7 | 20 | 160 | 280 | NONE | NONE | NONE | NONE | NONE | 4.9 | 26 | NONE |
| Example 17-8 | 20 | 170 | 280 | NONE | NONE | NONE | NONE | NONE | 5.0 | 26 | NONE |
| Example 17-9 | 20 | 175 | 300 | NONE | NONE | NONE | NONE | NONE | 5.0 | 24 | NONE |

TABLE 2-18

| Example | Temperature of Cavity Z | Temperature of Cavity Y | Molding Time Second | Evaluation Deformation | Evaluation Surface Condition | Evaluation Air Mark | Evaluation Die Line | Evaluation Bit | Rt | Sm | Appearance of Paint Film |
|---|---|---|---|---|---|---|---|---|---|---|---|
| Example 18-1 | 30 | 110 | 230 | NONE | YES | NONE | YES | YES | 11.5 | 198 | YES |
| Example 18-2 | 30 | 115 | 230 | NONE | SOME | NONE | SOME | SOME | 7.6 | 143 | SOME |
| Example 18-3 | 30 | 120 | 230 | NONE | SOME | NONE | SOME | SOME | 5.9 | 64 | SOME |
| Example 18-4 | 30 | 130 | 230 | NONE | SOME | NONE | NONE | NONE | 5.4 | 32 | NONE |
| Example 18-5 | 30 | 140 | 250 | NONE | SOME | NONE | NONE | NONE | 5.0 | 30 | NONE |
| Example 18-6 | 30 | 150 | 250 | NONE | NONE | NONE | NONE | NONE | 4.9 | 24 | NONE |
| Example 18-7 | 30 | 160 | 270 | NONE | NONE | NONE | NONE | NONE | 5.2 | 25 | NONE |
| Example 18-8 | 30 | 170 | 270 | NONE | NONE | NONE | NONE | NONE | 5.0 | 26 | NONE |
| Example 18-9 | 30 | 175 | 300 | NONE | NONE | NONE | NONE | NONE | 5.1 | 27 | NONE |

TABLE 2-19

| Example | Temperature of Cavity Z | Temperature of Cavity Y | Molding Time Second | Evaluation Deformation | Evaluation Surface Condition | Evaluation Air Mark | Evaluation Die Line | Evaluation Bit | Rt | Sm | Appearance of Paint Film |
|---|---|---|---|---|---|---|---|---|---|---|---|
| Example 19-1 | 50 | 110 | 210 | NONE | YES | NONE | YES | YES | 10.6 | 164 | YES |
| Example 19-2 | 50 | 115 | 210 | NONE | SOME | NONE | SOME | SOME | 7.2 | 131 | SOME |
| Example 19-3 | 50 | 120 | 230 | NONE | SOME | NONE | SOME | SOME | 6.6 | 65 | SOME |
| Example 19-4 | 50 | 130 | 230 | NONE | NONE | NONE | NONE | NONE | 5.4 | 34 | NONE |
| Example 19-5 | 50 | 140 | 250 | NONE | SOME | NONE | NONE | NONE | 5.2 | 28 | NONE |
| Example 19-6 | 50 | 150 | 250 | NONE | NONE | NONE | NONE | NONE | 5.2 | 27 | NONE |
| Example 19-7 | 50 | 160 | 270 | NONE | NONE | NONE | NONE | NONE | 5.1 | 26 | NONE |

TABLE 2-19-continued

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 19-8 | 50 | 170 | 270 | NONE | NONE | NONE | NONE | NONE | 5.2 | 26 | NONE |
| Example 19-9 | 50 | 175 | 300 | NONE | NONE | NONE | NONE | NONE | 5.1 | 26 | NONE |

TABLE 2-20

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 20-1 | 80 | 110 | 210 | NONE | YES | NONE | YES | YES | 10.4 | 158 | YES |
| Example 20-2 | 80 | 115 | 210 | NONE | SOME | NONE | SOME | SOME | 6.8 | 99 | SOME |
| Example 20-3 | 80 | 120 | 230 | NONE | NONE | NONE | NONE | NONE | 6.2 | 49 | NONE |
| Example 20-4 | 80 | 130 | 230 | NONE | NONE | NONE | NONE | NONE | 5.8 | 39 | NONE |
| Example 20-5 | 80 | 140 | 250 | NONE | SOME | NONE | NONE | NONE | 5.2 | 30 | NONE |
| Example 20-6 | 80 | 150 | 250 | NONE | NONE | NONE | NONE | NONE | 5.0 | 24 | NONE |
| Example 20-7 | 80 | 160 | 270 | NONE | NONE | NONE | NONE | NONE | 5.1 | 25 | NONE |
| Example 20-8 | 80 | 170 | 270 | NONE | NONE | NONE | NONE | NONE | 5.1 | 25 | NONE |
| Example 20-9 | 80 | 175 | 300 | NONE | NONE | NONE | NONE | NONE | 5.1 | 24 | NONE |

TABLE 2-21

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 21-1 | 100 | 110 | 230 | NONE | YES | NONE | YES | YES | 10.0 | 154 | YES |
| Example 21-2 | 100 | 115 | 230 | NONE | NONE | NONE | NONE | NONE | 6.7 | 96 | NONE |
| Example 21-3 | 100 | 120 | 250 | NONE | NONE | NONE | NONE | NONE | 5.9 | 56 | NONE |
| Example 21-4 | 100 | 130 | 250 | NONE | NONE | NONE | NONE | NONE | 5.4 | 40 | NONE |
| Example 21-5 | 100 | 140 | 270 | NONE | SOME | NONE | NONE | NONE | 5.0 | 27 | NONE |
| Example 21-6 | 100 | 150 | 270 | NONE | NONE | NONE | NONE | NONE | 4.9 | 26 | NONE |
| Example 21-7 | 100 | 160 | 290 | NONE | NONE | NONE | NONE | NONE | 5.0 | 25 | NONE |
| Example 21-8 | 100 | 170 | 290 | NONE | NONE | NONE | NONE | NONE | 5.1 | 25 | NONE |
| Example 21-9 | 100 | 175 | 320 | NONE | NONE | NONE | NONE | NONE | 5.1 | 25 | NONE |

TABLE 2-22

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 22-1 | 105 | 110 | 230 | SOME | YES | NONE | YES | SOME | 9.4 | 155 | YES |
| Example 22-2 | 105 | 115 | 230 | SOME | NONE | NONE | NONE | NONE | 5.8 | 72 | SOME |
| Example 22-3 | 105 | 120 | 250 | SOME | NONE | NONE | NONE | NONE | 5.4 | 48 | SOME |
| Example 22-4 | 105 | 130 | 250 | SOME | NONE | NONE | NONE | NONE | 5.0 | 28 | SOME |
| Example 22-5 | 105 | 140 | 270 | YES | NONE | NONE | NONE | NONE | 4.9 | 26 | YES |
| Example 22-6 | 105 | 150 | 270 | YES | NONE | NONE | NONE | NONE | 5.1 | 25 | YES |
| Example 22-7 | 105 | 160 | 290 | YES | NONE | NONE | NONE | NONE | 5.1 | 26 | YES |
| Example 22-8 | 105 | 170 | 290 | YES | NONE | NONE | NONE | NONE | 5.1 | 26 | YES |
| Example 22-9 | 105 | 175 | 320 | YES | NONE | NONE | NONE | NONE | 5.0 | 26 | YES |

It can be seen from Tables 2-16 –Tables 2-22 that the molding time rises to 300 seconds if the cavity surface temperature Y° C. reaches 175° C. while the parison adheres to the cavity. Further, it can be seen from Table 2-21 that the deformation of the molded article emerges and therefore the paint film appearance of the molded article becomes inferior if Z° C., which indicates the cavity surface temperature at the time when a mold opening process is started for taking out the molded article for automotive exterior panel, exceeds 100° C.

TABLE 2-23

| | Temperature of Cavity | | Content of Filler | Sanding Time | Molding Time | Evaluation | | | | | | | Appearance of |
| | | | | | | | Surface | Air | Die | | | | |
| Example | Z | Y | % | Minute | Second | Deformation | Condition | Mark | Line | Bit | Rt | Sm | Paint Film |
|---|---|---|---|---|---|---|---|---|---|---|---|---|---|
| 23-1 | 70 | 125 | 0 | 40 | 230 | NONE | NONE | NONE | NONE | NONE | 6.0 | 50 | NONE |
| 23-2 | 70 | 125 | 1 | 40 | 230 | NONE | NONE | NONE | NONE | NONE | 6.0 | 52 | NONE |
| 23-3 | 70 | 125 | 2 | 39 | 230 | NONE | NONE | NONE | NONE | NONE | 6.0 | 53 | NONE |
| 23-4 | 70 | 125 | 3 | 26 | 230 | NONE | NONE | NONE | NONE | NONE | 6.1 | 49 | NONE |
| 23-5 | 70 | 125 | 5 | 20 | 230 | NONE | NONE | NONE | NONE | NONE | 6.2 | 50 | NONE |
| 23-6 | 70 | 125 | 30 | 15 | 230 | NONE | NONE | NONE | NONE | NONE | 6.2 | 50 | NONE |
| 23-7 | 70 | 125 | 35 | 15 | 230 | NONE | NONE | NONE | NONE | NONE | 6.3 | 49 | NONE |
| 23-8 | 70 | 125 | 40 | 10 | 230 | NONE | NONE | NONE | NONE | NONE | 6.4 | 51 | YES |
| 23-9 | 70 | 125 | 50 | — | — | — | — | — | — | — | — | — | — |

In Table 2-23, if the filler content exceeds 40% by weight, elongation of the parison becomes inferior and therefore rough surface is generated in the surface. As a result, the paint film appearance of the molded article becomes inferior. The elongation of Sample 9 whose filler content was 50% by weight was so poor that Sample 9 could not be molded because holes were formed in the article during the molding operation.

Based on these results it can be seen that, if the filler content exceeds 35% by weight, elongation of the parison becomes extremely inferior and therefore the paint film appearance of the molded article becomes inferior because of the inferior surface condition of the molded article. To the contrary, it can be seen that, if the filler content is less than 3% by weight, the time required for sanding the parting lines is as long as about 40 minutes.

TABLE 2-24

| | Temperature of Cavity | | Molding Time | Evaluation | | | | | | | Appearance of |
| | | | | | Surface | Air | Die | | | | |
| Example | Z | Y | Second | Deformation | Condition | Mark | Line | Bit | Rt | Sm | Paint Film |
|---|---|---|---|---|---|---|---|---|---|---|---|
| Example 24-1 | 70 | 110 | 210 | NONE | YES | NONE | YES | YES | 10.8 | 166 | YES |
| Example 24-2 | 70 | 115 | 210 | NONE | SOME | NONE | SOME | SOME | 7.4 | 134 | SOME |
| Example 24-3 | 70 | 120 | 230 | NONE | NONE | NONE | NONE | NONE | 6.6 | 59 | NONE |
| Example 24-4 | 70 | 130 | 230 | NONE | NONE | NONE | NONE | NONE | 5.5 | 30 | NONE |
| Example 24-5 | 70 | 140 | 250 | NONE | NONE | NONE | NONE | NONE | 4.6 | 24 | NONE |
| Example 24-6 | 70 | 150 | 250 | NONE | NONE | NONE | NONE | NONE | 2.1 | 12 | NONE |
| Example 24-7 | 70 | 160 | 270 | NONE | NONE | NONE | NONE | NONE | 2.1 | 10 | NONE |
| Example 24-8 | 70 | 170 | 270 | NONE | NONE | NONE | NONE | NONE | 2.2 | 11 | NONE |
| Example 24-9 | 70 | 175 | 280 | NONE | NONE | NONE | NONE | NONE | 2.1 | 11 | NONE |

TABLE 2-25

| Example | Temperature of Cavity Z | Y | Molding Time Second | Surface Deformation | Condition | Air Mark | Die Line | Bit | Rt | Sm | Appearance of Paint Film |
|---|---|---|---|---|---|---|---|---|---|---|---|
| Example 25-1 | 70 | 110 | 210 | NONE | YES | NONE | YES | YES | 10.6 | 169 | YES |
| Example 25-2 | 70 | 115 | 210 | NONE | SOME | NONE | SOME | SOME | 7.6 | 136 | SOME |
| Example 25-3 | 70 | 120 | 230 | NONE | NONE | NONE | NONE | NONE | 6.5 | 59 | NONE |
| Example 25-4 | 70 | 130 | 230 | NONE | NONE | NONE | NONE | NONE | 5.4 | 42 | NONE |
| Example 25-5 | 70 | 140 | 250 | NONE | NONE | NONE | NONE | NONE | 2.8 | 28 | NONE |
| Example 25-6 | 70 | 150 | 250 | NONE | NONE | NONE | NONE | NONE | 1.2 | 10 | NONE |
| Example 25-7 | 70 | 160 | 270 | NONE | NONE | NONE | NONE | NONE | 0.9 | 11 | NONE |
| Example 25-8 | 70 | 170 | 270 | NONE | NONE | NONE | NONE | NONE | 1.0 | 10 | NONE |
| Example 25-9 | 70 | 175 | 280 | NONE | NONE | NONE | NONE | NONE | 1.1 | 11 | NONE |

TABLE 2-26

| Example | Temperature of Cavity Z | Y | Molding Time Second | Surface Deformation | Condition | Air Mark | Die Line | Bit | Rt | Sm | Appearance of Paint Film |
|---|---|---|---|---|---|---|---|---|---|---|---|
| Example 26-1 | 70 | 110 | 210 | NONE | YES | NONE | YES | YES | 11.8 | 165 | YES |
| Example 26-2 | 70 | 115 | 210 | NONE | SOME | NONE | SOME | SOME | 7.4 | 144 | SOME |
| Example 26-3 | 70 | 120 | 230 | NONE | NONE | NONE | NONE | NONE | 6.0 | 61 | NONE |
| Example 26-4 | 70 | 130 | 230 | NONE | NONE | NONE | NONE | NONE | 5.5 | 40 | NONE |
| Example 26-5 | 70 | 140 | 250 | NONE | NONE | NONE | NONE | NONE | 2.4 | 27 | NONE |
| Example 26-6 | 70 | 150 | 250 | NONE | NONE | NONE | NONE | NONE | 1.2 | 14 | NONE |
| Example 26-7 | 70 | 160 | 270 | NONE | NONE | SOME | NONE | NONE | 1.1 | 11 | SOME |
| Example 26-8 | 70 | 170 | 270 | NONE | NONE | SOME | NONE | NONE | 1.1 | 11 | SOME |
| Example 26-9 | 70 | 175 | 280 | NONE | NONE | SOME | NONE | NONE | 1.1 | 10 | SOME |

TABLE 2-27

| Example | Temperature of Cavity Z | Y | Molding Time Second | Surface Deformation | Condition | Air Mark | Die Line | Bit | Rt | Sm | Appearance of Paint Film |
|---|---|---|---|---|---|---|---|---|---|---|---|
| Example 27-1 | 70 | 110 | 210 | NONE | YES | NONE | YES | YES | 12.0 | 184 | YES |
| Example 27-2 | 70 | 115 | 210 | NONE | SOME | NONE | SOME | SOME | 7.8 | 132 | SOME |
| Example 27-3 | 70 | 120 | 230 | NONE | NONE | SOME | NONE | NONE | 6.1 | 59 | SOME |
| Example 27-4 | 70 | 130 | 230 | NONE | NONE | SOME | NONE | NONE | 5.4 | 40 | SOME |
| Example 27-5 | 70 | 140 | 250 | NONE | NONE | SOME | NONE | NONE | 2.3 | 24 | SOME |
| Example 27-6 | 70 | 150 | 250 | NONE | NONE | YES | NONE | NONE | 1.2 | 12 | YES |
| Example 27-7 | 70 | 160 | 270 | NONE | NONE | YES | NONE | NONE | 0.9 | 10 | YES |
| Example 27-8 | 70 | 170 | 270 | NONE | NONE | YES | NONE | NONE | 0.8 | 11 | YES |
| Example 27-9 | 70 | 170 | 280 | NONE | NONE | YES | NONE | NONE | 0.8 | 11 | YES |

TABLE 2-28

| Example | Temperature of Cavity Z | Y | Molding Time Second | Surface Deformation | Condition | Air Mark | Die Line | Bit | Rt | Sm | Appearance of Paint Film |
|---|---|---|---|---|---|---|---|---|---|---|---|
| Example 28-1 | 70 | 110 | 210 | NONE | YES | NONE | YES | YES | 11.8 | 175 | YES |
| Example 28-2 | 70 | 115 | 210 | NONE | SOME | NONE | SOME | SOME | 8.0 | 120 | YES |
| Example 28-3 | 70 | 120 | 230 | NONE | SOME | NONE | NONE | NONE | 7.4 | 66 | YES |
| Example 28-4 | 70 | 130 | 230 | NONE | SOME | NONE | NONE | NONE | 8.4 | 35 | SOME |
| Example 28-5 | 70 | 140 | 250 | NONE | NONE | NONE | NONE | NONE | 9.3 | 29 | NONE |
| Example 28-6 | 70 | 150 | 250 | NONE | NONE | NONE | NONE | NONE | 9.0 | 30 | NONE |
| Example 28-7 | 70 | 160 | 270 | NONE | NONE | SOME | NONE | NONE | 9.1 | 31 | NONE |

TABLE 2-28-continued

| | Temperature of Cavity | | Molding Time | Evaluation | | | | | | | Appearance of |
|---|---|---|---|---|---|---|---|---|---|---|---|
| | | | | | Surface | Air | Die | | | | |
| Example | Z | Y | Second | Deformation | Condition | Mark | Line | Bit | Rt | Sm | Paint Film |
| Example 28-8 | 70 | 170 | 270 | NONE | NONE | SOME | NONE | NONE | 8.9 | 31 | NONE |
| Example 28-9 | 70 | 175 | 280 | NONE | NONE | SOME | NONE | NONE | 8.9 | 31 | NONE |

TABLE 2-29

| | Temperature of Cavity | | Molding Time | Evaluation | | | | | | | Appearance of |
|---|---|---|---|---|---|---|---|---|---|---|---|
| | | | | | Surface | Air | Die | | | | |
| Example | Z | Y | Second | Deformation | Condition | Mark | Line | Bit | Rt | Sm | Paint Film |
| Example 29-1 | 70 | 110 | 210 | NONE | YES | NONE | YES | YES | 12.0 | 189 | YES |
| Example 29-2 | 70 | 115 | 210 | NONE | SOME | NONE | SOME | SOME | 8.4 | 119 | YES |
| Example 29-3 | 70 | 120 | 230 | NONE | SOME | NONE | NONE | NONE | 8.6 | 61 | YES |
| Example 29-4 | 70 | 130 | 230 | NONE | SOME | NONE | NONE | NONE | 9.8 | 40 | SOME |
| Example 29-5 | 70 | 140 | 250 | NONE | NONE | NONE | NONE | NONE | 10.2 | 35 | NONE |
| Example 29-6 | 70 | 150 | 250 | NONE | NONE | NONE | NONE | NONE | 10.1 | 30 | NONE |
| Example 29-7 | 70 | 160 | 270 | NONE | NONE | SOME | NONE | NONE | 10.1 | 30 | SOME |
| Example 29-8 | 70 | 170 | 270 | NONE | NONE | SOME | NONE | NONE | 10.2 | 30 | NONE |
| Example 29-9 | 70 | 175 | 280 | NONE | NONE | SOME | NONE | NONE | 10.2 | 30 | NONE |

It can be seen from Tables 2-24~Tables 2-29 that the surface roughness Rt of the minute concavities/convexities of cavity needs to be 0.9 to 9.0 μm.

Samples in Table 2-27 have extremely poor paint film appearance. Also, samples in Table 2-29 have poor paint film appearance. Based on these results, it can be seen that the surface roughness Rt of the minute concavities/convexities of cavity needs to be 0.9 to 9.0 μm.

TABLE 2-30

| | Temperature of Cavity | | Molding Time | Evaluation | | | | | | | Appearance of |
|---|---|---|---|---|---|---|---|---|---|---|---|
| | | | | | Surface | Air | Die | | | | |
| Example | Z | Y | Second | Deformation | Condition | Mark | Line | Bit | Rt | Sm | Paint Film |
| Example 30-1 | 70 | 110 | 210 | NONE | YES | NONE | YES | YES | 12.2 | 186 | YES |
| Example 30-2 | 70 | 115 | 210 | NONE | SOME | NONE | SOME | SOME | 7.8 | 119 | SOME |
| Example 30-3 | 70 | 120 | 230 | NONE | NONE | NONE | NONE | NONE | 6.9 | 70 | NONE |
| Example 30-4 | 70 | 130 | 230 | NONE | NONE | NONE | NONE | NONE | 5.2 | 42 | NONE |
| Example 30-5 | 70 | 140 | 250 | NONE | NONE | NONE | NONE | NONE | 3.4 | 24 | NONE |
| Example 30-6 | 70 | 150 | 250 | NONE | NONE | NONE | NONE | NONE | 3.2 | 11.0 | NONE |
| Example 30-7 | 70 | 160 | 270 | NONE | NONE | NONE | NONE | NONE | 3.0 | 10.0 | NONE |
| Example 30-8 | 70 | 170 | 270 | NONE | NONE | NONE | NONE | NONE | 3.1 | 10.2 | NONE |
| Example 30-9 | 70 | 175 | 280 | NONE | NONE | NONE | NONE | NONE | 3.1 | 10.2 | NONE |

TABLE 2-31

| | Temperature of Cavity | | Molding Time | Evaluation | | | | | | | Appearance of |
|---|---|---|---|---|---|---|---|---|---|---|---|
| | | | | | Surface | Air | Die | | | | |
| Example | Z | Y | Second | Deformation | Condition | Mark | Line | Bit | Rt | Sm | Paint Film |
| Example 31-1 | 70 | 110 | 210 | NONE | YES | NONE | YES | YES | 12.4 | 180 | YES |
| Example 31-2 | 70 | 115 | 210 | NONE | SOME | NONE | SOME | SOME | 8.7 | 140 | SOME |
| Example 31-3 | 70 | 120 | 230 | NONE | NONE | SOME | NONE | NONE | 7.0 | 98 | SOME |
| Example 31-4 | 70 | 130 | 230 | NONE | NONE | SOME | NONE | NONE | 5.8 | 38 | SOME |
| Example 31-5 | 70 | 140 | 250 | NONE | NONE | SOME | NONE | NONE | 3.7 | 12 | SOME |

TABLE 2-31-continued

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 31-6 | 70 | 150 | 250 | NONE | NONE | YES | NONE | NONE | 3.2 | 8.9 | YES |
| Example 31-7 | 70 | 160 | 270 | NONE | NONE | YES | NONE | NONE | 2.9 | 8.9 | YES |
| Example 31-8 | 70 | 170 | 270 | NONE | NONE | YES | NONE | NONE | 2.9 | 9.0 | YES |
| Example 31-9 | 70 | 175 | 280 | NONE | NONE | YES | NONE | NONE | 2.9 | 9.1 | YES |

TABLE 2-32

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 32-1 | 70 | 110 | 210 | NONE | YES | NONE | YES | YES | 12.6 | 198 | YES |
| Example 32-2 | 70 | 115 | 210 | NONE | SOME | NONE | NONE | NONE | 7.8 | 160 | SOME |
| Example 32-3 | 70 | 120 | 230 | NONE | SOME | NONE | NONE | NONE | 6.4 | 155 | SOME |
| Example 32-4 | 70 | 130 | 230 | NONE | SOME | NONE | NONE | NONE | 5.5 | 149 | SOME |
| Example 32-5 | 70 | 140 | 250 | NONE | NONE | NONE | NONE | NONE | 4.9 | 150 | NONE |
| Example 32-6 | 70 | 150 | 250 | NONE | NONE | NONE | NONE | NONE | 5.0 | 150 | NONE |
| Example 32-7 | 70 | 160 | 270 | NONE | NONE | NONE | NONE | NONE | 5.0 | 150 | NONE |
| Example 32-8 | 70 | 170 | 270 | NONE | NONE | NONE | NONE | NONE | 5.0 | 150 | NONE |
| Example 32-9 | 70 | 175 | 280 | NONE | NONE | NONE | NONE | NONE | 5.0 | 152 | NONE |

TABLE 2-33

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 33-1 | 70 | 110 | 210 | NONE | YES | NONE | YES | YES | 12.6 | 202 | YES |
| Example 33-2 | 70 | 115 | 210 | NONE | SOME | NONE | NONE | NONE | 7.9 | 184 | SOME |
| Example 33-3 | 70 | 120 | 230 | NONE | SOME | NONE | NONE | NONE | 6.5 | 162 | SOME |
| Example 33-4 | 70 | 130 | 230 | NONE | SOME | NONE | NONE | NONE | 5.5 | 160 | SOME |
| Example 33-5 | 70 | 140 | 250 | NONE | SOME | NONE | NONE | NONE | 4.8 | 160 | SOME |
| Example 33-6 | 70 | 150 | 250 | NONE | NONE | NONE | NONE | NONE | 5.0 | 160 | SOME |
| Example 33-7 | 70 | 160 | 270 | NONE | NONE | NONE | NONE | NONE | 5.1 | 160 | SOME |
| Example 33-8 | 70 | 170 | 270 | NONE | NONE | NONE | NONE | NONE | 5.1 | 159 | SOME |
| Example 33-9 | 70 | 175 | 280 | NONE | NONE | NONE | NONE | NONE | 5.1 | 161 | SOME |

It can be seen from Tables 2-30 –Tables 2-33 that the average peak-to-peak distance Sm of the minute concavities/convexities of cavity needs to be 10 to 150 μm.

Samples in Table 2-31 have extremely poor paint film appearance. Also, samples in Table 2-33 have poor paint film appearance. Based on these results, it can be seen that the average peak-to-peak distance of the minute concavities/convexities of cavity needs to be 10 to 150 μm.

It can be seen from Tables 2-16–Tables 2-33 that the molded article for automotive exterior panel needs to have surface irregularities comprising a surface roughness Rt of 0.9 to 9.0 μm and an average peak-to-peak distance Sm of 10 to 150 μm.

TABLE 2-34

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 34-1 | 70 | 110 | 210 | NONE | YES | NONE | YES | YES | 12.6 | 202 | YES |
| Example 34-2 | 70 | 115 | 210 | NONE | SOME | NONE | YES | YES | 12.4 | 120 | YES |

TABLE 2-34-continued

| | Temperature of Cavity | | Molding Time | Evaluation | | | | | | | Appearance of |
|---|---|---|---|---|---|---|---|---|---|---|---|
| Example | Z | Y | Second | Deformation | Surface Condition | Air Mark | Die Line | Bit | Rt | Sm | Paint Film |
| Example 34-3 | 70 | 120 | 230 | NONE | SOME | NONE | NONE | NONE | 6.4 | 58 | NONE |
| Example 34-4 | 70 | 125 | 230 | NONE | SOME | NONE | NONE | NONE | 5.8 | 38 | SOME |
| Example 34-5 | 70 | 130 | 250 | NONE | SOME | NONE | NONE | NONE | 5.0 | 25 | NONE |
| Example 34-6 | 70 | 140 | 250 | NONE | NONE | NONE | NONE | NONE | 5.0 | 25 | NONE |
| Example 34-7 | 70 | 150 | 270 | NONE | NONE | NONE | NONE | NONE | 5.0 | 26 | NONE |
| Example 34-8 | 70 | 160 | 270 | NONE | NONE | NONE | NONE | NONE | 5.1 | 24 | NONE |
| Example 34-9 | 70 | 165 | 300 | NONE | NONE | NONE | NONE | NONE | 5.0 | 25 | NONE |

TABLE 2-35

| | Temperature of Cavity | | Content of Filler | Sanding Time | Molding Time | Evaluation | | | | | | | Appearance of |
|---|---|---|---|---|---|---|---|---|---|---|---|---|---|
| Example | Z | Y | % | Minute | Second | Deformation | Surface Condition | Air Mark | Die Line | Bit | Rt | Sm | Paint Film |
| 35-1 | 70 | 125 | 0 | 50 | 230 | NONE | NONE | NONE | NONE | NONE | 6.4 | 38 | NONE |
| 35-2 | 70 | 125 | 1 | 50 | 230 | NONE | NONE | NONE | NONE | NONE | 6.4 | 37 | NONE |
| 35-3 | 70 | 125 | 2 | 47 | 230 | NONE | NONE | NONE | NONE | NONE | 6.4 | 38 | NONE |
| 35-4 | 70 | 125 | 3 | 36 | 230 | NONE | SOME | NONE | NONE | NONE | 6.4 | 38 | NONE |
| 35-5 | 70 | 125 | 5 | 30 | 230 | NONE | SOME | NONE | NONE | NONE | 6.3 | 40 | NONE |
| 35-6 | 70 | 125 | 30 | 25 | 230 | NONE | NONE | NONE | NONE | NONE | 6.5 | 39 | NONE |
| 35-7 | 70 | 125 | 35 | 20 | 230 | NONE | NONE | NONE | NONE | NONE | 6.6 | 38 | NONE |
| 35-8 | 70 | 125 | 40 | 20 | 230 | NONE | YES | NONE | NONE | NONE | 6.6 | 38 | YES |
| 35-9 | 70 | 125 | 50 | — | — | — | — | — | — | — | — | — | — |

In Table 2-35, if the filler content exceeds 40% by weight, elongation of the parison becomes inferior and therefore rough surface emerges in the surface. As a result, the paint film appearance of the molded article becomes inferior. The elongation of Sample 9 whose filler content was 50% by weight was so poor that Sample 9 could not be molded because holes were formed in the article during the molding operation.

Based on these results, it can be seen that, if the filler content exceeds 35% by weight, elongation of the parison becomes extremely inferior and therefore the paint film appearance of the molded article becomes inferior because of the inferior surface condition of the molded article. To the contrary, it can be seen that, if the filler content is less than 3% by weight, the time required for sanding the parting lines is as long as about 50 minutes.

TABLE 2-36

| | Temperature of Cavity | | Molding Time | Evaluation | | | | | | | Appearance of |
|---|---|---|---|---|---|---|---|---|---|---|---|
| Example | Z | Y | Second | Deformation | Surface Condition | Air Mark | Die Line | Bit | Rt | Sm | Paint Film |
| Example 36-1 | 70 | 110 | 210 | NONE | YES | NONE | YES | YES | 12.3 | 195 | YES |
| Example 36-2 | 70 | 115 | 210 | NONE | SOME | NONE | YES | YES | 11.0 | 140 | YES |
| Example 36-3 | 70 | 120 | 230 | NONE | NONE | NONE | NONE | NONE | 6.8 | 48 | NONE |
| Example 36-4 | 70 | 125 | 230 | NONE | NONE | NONE | NONE | NONE | 4.9 | 18 | NONE |
| Example 36-5 | 70 | 130 | 250 | NONE | NONE | NONE | NONE | NONE | 2.0 | 11 | NONE |
| Example 36-6 | 70 | 140 | 250 | NONE | NONE | NONE | NONE | NONE | 2.0 | 11 | NONE |
| Example 36-7 | 70 | 150 | 270 | NONE | NONE | NONE | NONE | NONE | 2.1 | 11 | NONE |
| Example 36-8 | 70 | 160 | 270 | NONE | NONE | NONE | NONE | NONE | 2.1 | 11 | NONE |
| Example 36-9 | 70 | 165 | 300 | NONE | NONE | NONE | NONE | NONE | 2.0 | 11 | NONE |

TABLE 2-37

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 37-1 | 70 | 110 | 210 | NONE | YES | NONE | YES | YES | 12.4 | 204 | YES |
| Example 37-2 | 70 | 115 | 210 | NONE | SOME | NONE | YES | SOME | 11.2 | 135 | YES |
| Example 37-3 | 70 | 120 | 230 | NONE | NONE | NONE | NONE | NONE | 6.5 | 52 | NONE |
| Example 37-4 | 70 | 125 | 230 | NONE | NONE | NONE | NONE | NONE | 4.2 | 20 | NONE |
| Example 37-5 | 70 | 130 | 250 | NONE | NONE | NONE | NONE | NONE | 1.4 | 12 | NONE |
| Example 37-6 | 70 | 140 | 250 | NONE | NONE | NONE | NONE | NONE | 1.1 | 11 | NONE |
| Example 37-7 | 70 | 150 | 270 | NONE | NONE | NONE | NONE | NONE | 1.0 | 11 | NONE |
| Example 37-8 | 70 | 160 | 270 | NONE | NONE | NONE | NONE | NONE | 1.1 | 10 | NONE |
| Example 37-9 | 70 | 165 | 300 | NONE | NONE | NONE | NONE | NONE | 1.0 | 10 | NONE |

TABLE 2-38

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 38-1 | 70 | 110 | 210 | NONE | YES | NONE | YES | YES | 12.4 | 203 | YES |
| Example 38-2 | 70 | 115 | 210 | NONE | SOME | NONE | YES | YES | 11.6 | 130 | YES |
| Example 38-3 | 70 | 120 | 230 | NONE | NONE | NONE | NONE | NONE | 6.2 | 58 | NONE |
| Example 38-4 | 70 | 125 | 230 | NONE | NONE | NONE | NONE | NONE | 4.3 | 24 | NONE |
| Example 38-5 | 70 | 130 | 250 | NONE | NONE | NONE | NONE | NONE | 1.3 | 14 | NONE |
| Example 38-6 | 70 | 140 | 250 | NONE | NONE | NONE | NONE | NONE | 0.9 | 10 | NONE |
| Example 38-7 | 70 | 150 | 270 | NONE | NONE | NONE | NONE | NONE | 0.9 | 11 | NONE |
| Example 38-8 | 70 | 160 | 270 | NONE | NONE | SOME | NONE | NONE | 1.0 | 10 | SOME |
| Example 38-9 | 70 | 165 | 300 | NONE | NONE | SOME | NONE | NONE | 0.9 | 10 | SOME |

TABLE 2-39

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 39-1 | 70 | 110 | 210 | NONE | YES | NONE | YES | YES | 12.8 | 195 | YES |
| Example 39-2 | 70 | 115 | 210 | NONE | YES | SOME | YES | YES | 11.4 | 138 | YES |
| Example 39-3 | 70 | 120 | 230 | NONE | NONE | SOME | NONE | NONE | 6.8 | 64 | SOME |
| Example 39-4 | 70 | 125 | 230 | NONE | NONE | YES | NONE | NONE | 4.6 | 28 | YES |
| Example 39-5 | 70 | 130 | 250 | NONE | NONE | YES | NONE | NONE | 1.2 | 14 | YES |
| Example 39-6 | 70 | 140 | 250 | NONE | NONE | YES | NONE | NONE | 0.8 | 10 | YES |
| Example 39-7 | 70 | 150 | 270 | NONE | NONE | YES | NONE | NONE | 0.7 | 9 | YES |
| Example 39-8 | 70 | 160 | 270 | NONE | NONE | YES | NONE | NONE | 0.8 | 9 | YES |
| Example 39-9 | 70 | 165 | 300 | NONE | NONE | SOME | NONE | NONE | 0.8 | 10 | SOME |

TABLE 2-40

| Example | Temperature of Cavity Z | Y | Molding Time Second | Evaluation Surface Deformation | Condition | Air Mark | Die Line | Bit | Rt | Sm | Appearance of Paint Film |
|---|---|---|---|---|---|---|---|---|---|---|---|
| Example 40-1 | 70 | 110 | 210 | NONE | YES | NONE | YES | YES | 12.6 | 201 | YES |
| Example 40-2 | 70 | 115 | 210 | NONE | SOME | NONE | YES | SOME | 11.9 | 124 | YES |
| Example 40-3 | 70 | 120 | 230 | NONE | NONE | NONE | NONE | NONE | 9.7 | 68 | NONE |
| Example 40-4 | 70 | 125 | 230 | NONE | NONE | NONE | NONE | NONE | 9.6 | 38 | NONE |
| Example 40-5 | 70 | 130 | 250 | NONE | NONE | NONE | NONE | NONE | 9.4 | 27 | NONE |
| Example 40-6 | 70 | 140 | 250 | NONE | NONE | NONE | NONE | NONE | 9.0 | 25 | NONE |
| Example 40-7 | 70 | 150 | 270 | NONE | NONE | NONE | NONE | NONE | 8.9 | 24 | NONE |

TABLE 2-40-continued

| Example | Temperature of Cavity Z | Temperature of Cavity Y | Molding Time Second | Evaluation Surface Deformation | Evaluation Condition | Evaluation Air Mark | Evaluation Die Line | Evaluation Bit | Rt | Sm | Appearance of Paint Film |
|---|---|---|---|---|---|---|---|---|---|---|---|
| Example 40-8 | 70 | 160 | 270 | NONE | NONE | NONE | NONE | NONE | 9.0 | 24 | NONE |
| Example 40-9 | 70 | 165 | 300 | NONE | NONE | NONE | NONE | NONE | 9.0 | 25 | NONE |

TABLE 2-41

| Example | Temperature of Cavity Z | Temperature of Cavity Y | Molding Time Second | Evaluation Surface Deformation | Evaluation Condition | Evaluation Air Mark | Evaluation Die Line | Evaluation Bit | Rt | Sm | Appearance of Paint Film |
|---|---|---|---|---|---|---|---|---|---|---|---|
| Example 41-1 | 70 | 110 | 210 | NONE | YES | NONE | YES | YES | 12.3 | 204 | YES |
| Example 41-2 | 70 | 115 | 210 | NONE | YES | NONE | YES | SOME | 11.3 | 134 | YES |
| Example 41-3 | 70 | 120 | 230 | NONE | SOME | NONE | NONE | NONE | 11.4 | 64 | YES |
| Example 41-4 | 70 | 125 | 230 | NONE | SOME | NONE | NONE | NONE | 10.9 | 39 | SOME |
| Example 41-5 | 70 | 130 | 250 | NONE | SOME | NONE | NONE | NONE | 10.2 | 28 | SOME |
| Example 41-6 | 70 | 140 | 250 | NONE | SOME | NONE | NONE | NONE | 10.2 | 25 | SOME |
| Example 41-7 | 70 | 150 | 270 | NONE | NONE | NONE | NONE | NONE | 10.0 | 25 | SOME |
| Example 41-8 | 70 | 160 | 270 | NONE | NONE | NONE | NONE | NONE | 10.1 | 25 | SOME |
| Example 41-9 | 70 | 165 | 300 | NONE | NONE | NONE | NONE | NONE | 10.1 | 25 | SOME |

It can be seen from Tables 2-36–Tables 2-41 that the molding time rises to 300 seconds if the cavity surface temperature Y° C. reaches 165° C. while the parison adheres to the cavity.

It can be seen from Tables 2-36–Tables 2-41 that the surface roughness Rt of the minute concavities/convexities of cavity needs to be 0.9 to 9.0 μm.

Samples in Table 2-39 have extremely poor paint film appearance. Also, samples in Table 2-40 have poor paint film appearance. Based on these results, it can be seen that the surface roughness Rt of the minute concavities/convexities of cavity needs to be 0.9 to 9.0 μm.

TABLE 2-42

| Example | Temperature of Cavity Z | Temperature of Cavity Y | Molding Time Second | Evaluation Surface Deformation | Evaluation Condition | Evaluation Air Mark | Evaluation Die Line | Evaluation Bit | Rt | Sm | Appearance of Paint Film |
|---|---|---|---|---|---|---|---|---|---|---|---|
| Example 42-1 | 70 | 110 | 210 | NONE | YES | NONE | YES | YES | 12.8 | 198 | YES |
| Example 42-2 | 70 | 115 | 210 | NONE | YES | NONE | YES | YES | 12.0 | 148 | YES |
| Example 42-3 | 70 | 120 | 230 | NONE | SOME | SOME | NONE | NONE | 7.0 | 59 | SOME |
| Example 42-4 | 70 | 125 | 230 | NONE | NONE | SOME | NONE | NONE | 5.1 | 28 | SOME |
| Example 42-5 | 70 | 130 | 250 | NONE | SOME | YES | NONE | NONE | 3.1 | 12 | YES |
| Example 42-6 | 70 | 140 | 250 | NONE | SOME | YES | NONE | NONE | 2.1 | 9 | YES |
| Example 42-7 | 70 | 150 | 270 | NONE | NONE | YES | NONE | NONE | 2.0 | 9 | YES |
| Example 42-8 | 70 | 160 | 270 | NONE | NONE | YES | NONE | NONE | 2.0 | 8 | YES |
| Example 42-9 | 70 | 165 | 300 | NONE | NONE | YES | NONE | NONE | 2.0 | 8 | YES |

TABLE 2-43

| Example | Temperature of Cavity Z | Temperature of Cavity Y | Molding Time Second | Evaluation Surface Deformation | Evaluation Condition | Evaluation Air Mark | Evaluation Die Line | Evaluation Bit | Rt | Sm | Appearance of Paint Film |
|---|---|---|---|---|---|---|---|---|---|---|---|
| Example 43-1 | 70 | 110 | 210 | NONE | YES | NONE | YES | YES | 13.3 | 208 | YES |
| Example 43-2 | 70 | 115 | 210 | NONE | SOME | NONE | YES | YES | 13.0 | 158 | YES |

TABLE 2-43-continued

| | Temperature of Cavity | | Molding Time | Evaluation | | | | | | | Appearance of |
|---|---|---|---|---|---|---|---|---|---|---|---|
| Example | Z | Y | Second | Surface Deformation | Condition | Air Mark | Die Line | Bit | Rt | Sm | Paint Film |
| Example 43-3 | 70 | 120 | 230 | NONE | NONE | NONE | NONE | NONE | 8.0 | 69 | NONE |
| Example 43-4 | 70 | 125 | 230 | NONE | NONE | NONE | NONE | NONE | 6.1 | 38 | NONE |
| Example 43-5 | 70 | 130 | 250 | NONE | NONE | NONE | NONE | NONE | 4.1 | 22 | NONE |
| Example 43-6 | 70 | 140 | 250 | NONE | NONE | NONE | NONE | NONE | 3.1 | 12 | NONE |
| Example 43-7 | 70 | 150 | 270 | NONE | NONE | NONE | NONE | NONE | 3.1 | 11 | NONE |
| Example 43-8 | 70 | 160 | 270 | NONE | NONE | NONE | NONE | NONE | 3.1 | 11 | NONE |
| Example 43-9 | 70 | 165 | 300 | NONE | NONE | NONE | NONE | NONE | 3.1 | 12 | NONE |

TABLE 2-44

| | Temperature of Cavity | | Molding Time | Evaluation | | | | | | | Appearance of |
|---|---|---|---|---|---|---|---|---|---|---|---|
| Example | Z | Y | Second | Surface Deformation | Condition | Air Mark | Die Line | Bit | Rt | Sm | Paint Film |
| Example 44-1 | 70 | 110 | 210 | NONE | YES | NONE | YES | YES | 12.4 | 199 | YES |
| Example 44-2 | 70 | 115 | 210 | NONE | YES | NONE | YES | YES | 11.8 | 155 | YES |
| Example 44-3 | 70 | 120 | 230 | NONE | SOME | NONE | NONE | NONE | 6.4 | 148 | SOME |
| Example 44-4 | 70 | 125 | 230 | NONE | NONE | NONE | NONE | NONE | 5.7 | 150 | SOME |
| Example 44-5 | 70 | 130 | 250 | NONE | NONE | NONE | NONE | NONE | 5.2 | 150 | NONE |
| Example 44-6 | 70 | 140 | 250 | NONE | NONE | NONE | NONE | NONE | 5.0 | 148 | NONE |
| Example 44-7 | 70 | 150 | 270 | NONE | NONE | NONE | NONE | NONE | 5.0 | 149 | SOME |
| Example 44-8 | 70 | 160 | 270 | NONE | NONE | NONE | NONE | NONE | 5.0 | 148 | SOME |
| Example 44-9 | 70 | 165 | 300 | NONE | NONE | NONE | NONE | NONE | 5.0 | 148 | SOME |

TABLE 2-45

| | Temperature of Cavity | | Molding Time | Evaluation | | | | | | | Appearance of |
|---|---|---|---|---|---|---|---|---|---|---|---|
| Example | Z | Y | Second | Surface Deformation | Condition | Air Mark | Die Line | Bit | Rt | Sm | Paint Film |
| Example 45-1 | 70 | 110 | 210 | NONE | YES | NONE | YES | YES | 11.9 | 210 | YES |
| Example 45-2 | 70 | 115 | 210 | NONE | YES | NONE | YES | YES | 11.8 | 184 | YES |
| Example 45-3 | 70 | 120 | 230 | NONE | SOME | NONE | NONE | NONE | 6.2 | 165 | SOME |
| Example 45-4 | 70 | 125 | 230 | NONE | SOME | NONE | NONE | NONE | 5.4 | 162 | SOME |
| Example 45-5 | 70 | 130 | 250 | NONE | NONE | NONE | NONE | NONE | 5.2 | 164 | SOME |
| Example 45-6 | 70 | 140 | 250 | NONE | NONE | NONE | NONE | NONE | 5.1 | 162 | SOME |
| Example 45-7 | 70 | 150 | 270 | NONE | NONE | NONE | NONE | NONE | 5.1 | 162 | YES |
| Example 45-8 | 70 | 160 | 270 | NONE | NONE | NONE | NONE | NONE | 5.1 | 161 | YES |
| Example 45-9 | 70 | 165 | 300 | NONE | NONE | NONE | NONE | NONE | 5.0 | 159 | YES |

It can be seen from Tables 2-42–Tables 2-45 that the average peak-to-peak distance Sm of the minute concavities/convexities of cavity needs to be 10 to 150 µm.

Samples in Table 2-42 have extremely poor paint film appearance. Also, samples in Table 2-45 have poor paint film appearance. Based on these results, it can be seen that the average peak-to-peak distance Sm of the minute concavities/convexities of cavity needs to be 10 to 150 µm.

It can be seen from Tables 2-34–Tables 2-45 that the molded article for automotive exterior panel needs to have surface irregularities comprising a surface roughness Rt of 0.9 to 9.0 µm and an average peak-to-peak distance Sm of 10 to 150 µm.

The objects and advantages of the present invention may be further realized and attained by means of the instrumentalities and combinations particularly pointed out in the appended claims. Accordingly, the drawing and description are to be regarded as illustrative in nature, and not as restrictive.

What is claimed is:

1. An automotive exterior panel with a smooth surface comprising:
   a blow molded article of a noncrystalline resin exhibiting a tensile modulus of 2000 Kg/cm$^2$ or more at 75° C., wherein said blow molded article has surface irregularities comprising a surface roughness in the range of from 0.9 to 9.0 µm and an average peak-to-peak distance in the range of from 10 to 150 µm, and wherein said panel has a 15 to 150 µm thick paint film.

2. An automotive exterior panel according to claim 1, wherein said panel is produced by disposing a parison, which is composed of a noncrystalline resin exhibiting a tensile modulus of 2000 Kg/cm² or more at 75° C., between mold halves having minute concavities/convexities such that the surface roughness is in the range of from 0.9 to 9.0 μm and the average peak-to-peak distance is in the range of from 10 to 150 μm;

closing said mold halves to from a cavity;

adhering said parison to said mold halves by introducing thereinto a pressurized air to said cavity whose surface temperature is set to Y° C. which falls in a range of Y=(0.96X+3) to Y=(0.96X+40), where X is a temperature at which the tensile modulus of the noncrystalline resin is 2000 Kg/cm²;

opening said mold halves and removing said hollow molded article; and painting an external face of said hollow molded article with a 15 to 150 μm thick paint film.

3. An automotive exterior panel with a smooth appearance, comprising:

a blow molded article of a crystalline resin exhibiting a flexural modulus of 9000 Kg/cm² or more at 23° C., wherein said blow molded article has surface irregularities comprising a surface roughness in the range of from 0.9 to 9.0 μm and an average peak-to-peak distance in the range of from 10 to 150 μm, and wherein said panel has a 15 to 150 μm thick paint film.

4. An automotive exterior panel according to claim 3, wherein said panel is produced by disposing a parison, which is composed of a crystalline resin exhibiting a flexural modulus of 9000 Kg/cm² or more at 23° C., between mold halves having minute concavities/convexities such that the surface roughness is in the range of from 0.9 to 9.0 μm and the average peak-to-peak distance is in the range of from 10 to 150 μm;

closing said mold halves to form a cavity;

adhering said parison to said mold halves by introducing a pressurized air to said cavity whose surface temperature is raised during the adhesion to y° C. which falls in the range of A<y<1.07B, where A is a peak crystallization temperature (° C.) in a DSC curve of the crystalline resin which exhibits a flexural modulus of 9000 Kg/cm² or more at 23° C.; and B is a peak fusion temperature (° C.) in a DSC curve of the crystalline resin which exhibits a flexural modulus of 9000 Kg/cm² or more at 23° C.;

opening said mold halves and removing said hollow molded article; and painting an external face of said hollow molded article with a 15 to 150 μm thick paint film.

5. An automotive exterior panel according to claim 3, wherein said panel is produced by disposing a parison, which is composed of a crystalline resin exhibiting a flexural modulus of 9000 Kg/cm² or more at 23° C., between mold halves having minute concavities/convexities such that the surface roughness is in the range of from 0.9 to 9.0 μm and the average peak-to-peak distance is in the range of from 10 to 150 μm;

raising a cavity surface temperature so as to reach a temperature y° C. falling in the range A<y<1.07B, where A is a peak crystallization temperature (° C.) in a DSC curve of the crystalline resin which exhibits a flexural modulus of 9000 Kg/cm² or more at 23° C. while B is a peak fusion temperature (° C.) in a DSC curve of the crystalline resin which exhibits a flexural modulus of 9000 Kg/cm² or more at 23° C.;

closing said mold halves to form a cavity;

adhering said parison to said mold halves by introducing a pressurized air into the cavity;

opening said mold halves and removing said hollow molded article; and painting an external face of said hollow molded article with a 15 to 150 μm thick paint film.

6. An automotive exterior panel according to claim 3, wherein said crystalline resin exhibiting a flexural modulus of 9000 Kg/cm² or more at 23° C. is incorporated with 3% to 35% by weight of an inorganic filler.

7. An automotive exterior panel according to claim 3, wherein said crystalline resin exhibiting a flexural modulus of 9000 Kg/cm² or more at 23° C. is polypropylene.

8. An automotive exterior panel according to claim 1 wherein said non-crystalline resin comprises one or more non-crystalline resins chosen from the group of resins consisting of Polycarbonate (PC), Polystyrene (PS), styrene acrylonitrile (SAN), polyvinyl-chloride (PVC), noncrystalline polyamide, polysulfone, modified polyphenylene oxide (PPO), and a mixture of acrylonitrile, butadiene, and styrene (ABS).

* * * * *